(12) United States Patent
Ji et al.

(10) Patent No.: US 12,476,339 B2
(45) Date of Patent: Nov. 18, 2025

(54) ELECTRODE SHEET AND PREPARATION METHOD THEREFOR, BATTERY CELL, BATTERY, AND ELECTRIC DEVICE

(71) Applicant: CONTEMPORARY AMPEREX TECHNOLOGY CO., LIMITED, Ningde (CN)

(72) Inventors: Xing Ji, Ningde (CN); Ting Li, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/255,588

(22) Filed: Jun. 30, 2025

(65) Prior Publication Data
US 2025/0329903 A1    Oct. 23, 2025

Related U.S. Application Data

(63) Continuation of application No. PCT/CN2024/092632, filed on May 11, 2024.

(30) Foreign Application Priority Data

May 22, 2023  (CN) .......................... 202310579297.0

(51) Int. Cl.
*H01M 50/593*    (2021.01)
*H01M 4/02*    (2006.01)
(Continued)

(52) U.S. Cl.
CPC ....... *H01M 50/593* (2021.01); *H01M 4/0404* (2013.01); *H01M 4/0416* (2013.01);
(Continued)

(58) Field of Classification Search
None
See application file for complete search history.

(56) References Cited

U.S. PATENT DOCUMENTS 12,057,563 B2 *   8/2024   Cai ....................... H01M 4/139

FOREIGN PATENT DOCUMENTS

CN   106129327 A   11/2016
CN   206250283 U    6/2017
(Continued)

OTHER PUBLICATIONS

International Search Report dated Jul. 25, 2024 for application PCT/CN2024/092632.
(Continued)

*Primary Examiner* — Tracy M Dove
(74) *Attorney, Agent, or Firm* — LADAS & PARRY LLP

(57) ABSTRACT

The electrode sheet includes a current collector, an active material layer, a first insulating layer, and a second insulating layer. The current collector includes a body portion and a tab extending from a first end of the body portion. The body portion includes a coated region and a transition region provided between the coated region and the tab; the active material layer is provided on a surface of the coated region; the first insulating layer is provided on an end surface of the body portion; at least part of the second insulating layer is provided on a surface of the transition region; the second insulating layer includes a first thermoplastic polymer and a second thermoplastic polymer.

20 Claims, 6 Drawing Sheets

(51) Int. Cl.
*H01M 4/04* (2006.01)
*H01M 4/66* (2006.01)

(52) U.S. Cl.
CPC ...... *H01M 4/661* (2013.01); *H01M 2004/021* (2013.01); *H01M 2220/20* (2013.01)

(56) References Cited

FOREIGN PATENT DOCUMENTS

| | | | |
|---|---|---|---|
| CN | 111180666 A | 5/2020 | |
| CN | 105940520 B * | 9/2020 | .......... H01M 10/058 |
| CN | 109148888 B | 1/2021 | |
| CN | 212365995 U | 1/2021 | |
| CN | 112310409 A | 2/2021 | |
| CN | 114122327 A | 3/2022 | |
| CN | 218827234 U | 4/2023 | |
| CN | 218918942 U | 4/2023 | |
| WO | 2021189454 A1 | 9/2021 | |
| WO | 20230068885 A1 | 4/2023 | |

OTHER PUBLICATIONS

Written Opinion dated Jul. 25, 2024 for application PCT/CN2024/092632.
Notification to Grant Patent Right for Invention dated Sep. 29, 2025 for application CN 202310579297.0.

* cited by examiner

ELECTRODE SHEET AND PREPARATION METHOD THEREFOR, BATTERY CELL, BATTERY, AND ELECTRIC DEVICE

CROSS-REFERENCE TO RELATED APPLICATIONS

This application is a continuation of International application PCT/CN2024/092632 filed on May 11, 2024 that claims priority to Chinese Patent Application No. 202310579297.0, filed on May 22, 2023. The content of these applications is incorporated herein by reference in its entirety.

TECHNICAL FIELD

The present application relates to the technical field of batteries, and in particular, to an electrode sheet and a preparation method therefor, a battery cell, a battery, and an electric device.

BACKGROUND

With increasingly serious environmental pollution, the new energy industry receives increasingly more attention from people. In the new energy industry, a battery technology is an important factor for the development thereof.

In the development of the battery technology, various design factors, such as energy density, cycle life, and reliability, need to be considered. The design of an electrode sheet in a battery cell is critical to the reliability of the battery cell. Therefore, how to provide an electrode sheet to improve the reliability of the battery cell is an urgent technical problem to be solved.

SUMMARY

The present application has been made in view of the above problem, and an objective thereof is to provide an electrode sheet improve the reliability of the battery cell.

In order to achieve the above objective, the present application provides an electrode sheet and a preparation method therefor, a battery cell, a battery, and an electric device.

According to a first aspect, there is provided an electrode sheet including a current collector, an active material layer, a first insulating layer, and a second insulating layer, where the current collector includes a body portion and a tab extending from a first end of the body portion, and the first end is an end of the body portion in a first direction; the body portion includes a coated region and a transition region provided between the coated region and the tab; the active material layer is provided on a surface of the coated region; the first insulating layer is provided on an end surface of the body portion at the first end; at least part of the second insulating layer is provided on a surface of the transition region, the second insulating layer includes a thermoplastic polymer including a first thermoplastic polymer and a second thermoplastic polymer, the first thermoplastic polymer has a volume particle size distribution $D_v50$ of 1 μm to 5 μm, and the second thermoplastic polymer has a volume particle size distribution $D_v50$ of 20 μm to 50 μm.

An embodiment of the present application provides an electrode sheet including a current collector, an active material layer, a first insulating layer, and a second insulating layer. The current collector includes a body portion and a tab extending from a first end of the body portion, and the first end of the body portion is an end of the body portion in a first direction. The body portion includes a coated region and a transition region provided between the coated region and the tab, the coated region being provided with an active material layer. In this way, by providing the transition region, there may be a distance between a cutting tool and the active material layer in a cutting process for the tab, thereby reducing peeling-off of the active material layer. The first insulating layer is provided on an end surface of the body portion at the first end, so that the first insulating layer can coat the end surface of the first end to reduce the risk of exposing the current collector at the end surface, thereby reducing the risk of the current collector exposed at the end surface overlapping an electrode of opposite polarity. Moreover, the first insulating layer can also coat a burr generated by the cutting process, thereby reducing the risk of the burr overlapping an electrode of opposite polarity. At least part of the second insulating layer is provided on a surface of the transition region, and the second insulating layer includes a thermoplastic polymer including a first thermoplastic polymer and a second thermoplastic polymer. In this way, a cutting line is located in the transition region. In the cutting process for the tab, the first thermoplastic polymer and the second thermoplastic polymer in the second insulating layer on the surface of the transition region are transformed from a solid state into a flowable state after being heated, and the thermoplastic polymer in the flowable state flows to the end surface of the first end and solidifies at the end surface after cooled. The first thermoplastic polymer has a volume particle size distribution $D_v50$ of 1 μm to 5 μm, and the second thermoplastic polymer has a volume particle size distribution $D_v50$ of 20 μm to 50 μm. Through cooperation between the second thermoplastic polymer having a larger particle size and the thermoplastic polymer having a smaller particle size, in the cutting process for the tab, the thermoplastic polymer having a larger particle size can increase a resistance to contraction of the second insulating layer toward a region close to the active material layer, reducing a contraction distance of the second insulating layer, which is advantageous to the improvement of uniformity and density of the second insulating layer, thereby reducing the risk of the transition region overlapping an electrode of opposite polarity. The thermoplastic polymer having a small particle size melts quickly, compensating for the disadvantage of the thermoplastic polymer having a large particle size melting slowly, which is advantageous to the formation of the uniform, dense first insulating layer on the end surface. Therefore, the technical solution of this embodiment of the present application can improve the reliability of the battery cell.

In a possible implementation, the second thermoplastic polymer has a volume particle size distribution $D_v50$ of 20 μm to 40 μm.

The second thermoplastic polymer has an appropriate particle size. After being heated and then transformed from the solid state into the flowable state, the second thermoplastic polymer has an appropriate flow path, which is advantageous to the formation of the uniform, dense first insulating layer on the end surface.

In a possible implementation, in the second insulating layer, a mass ratio m1:m2 of the first thermoplastic polymer to the second thermoplastic polymer is 1:1 to 3:1; and optionally, the mass ratio m1:m2 of the first thermoplastic polymer to the second thermoplastic polymer is 1:1 to 2:1.

A proper setting of the mass ratio of the first thermoplastic polymer to the second thermoplastic polymer in the second insulating layer is advantageous to further reduction of the distance by which the second insulating layer contracts in a direction toward the active material layer, thereby further reducing the risk of the transition region overlapping an electrode of opposite polarity.

In a possible implementation, a drop melting point of the thermoplastic polymer is 80° C. to 220° C. In this way, in the process of cutting the current collector provided with the second insulating layer, the thermoplastic polymer is transformed from a solid state into a flowable state under the action of heat generated by cutting, and the thermoplastic polymer in the flowable state may flow to the end surface of the current collector exposed after the cutting and a burr generated by the cutting, thereby facilitating the preparation of the first insulating layer. Optionally, the drop melting point of the thermoplastic polymer is 150° C. to 220° C. In this way, the risk of transforming the thermoplastic polymer into a flowable state by other factors in a process without cutting the current collector can be reduced.

In a possible implementation, a material of the thermoplastic polymer includes at least one of a crystalline thermoplastic polymer and an amorphous thermoplastic polymer; optionally, the crystalline thermoplastic polymer includes at least one of polyethylene, polypropylene, and polyamide; and optionally, the amorphous thermoplastic polymer includes at least one of microcrystalline wax, polystyrene, and polymethyl methacrylate.

In the above technical solution, the use of the thermoplastic polymer is advantageous to the formation of a uniform, dense coating on the end surface of the current collector exposed after cutting and on the burr.

In a possible implementation, the second insulating layer further includes a binder. The provision of the binder is advantageous to the improvement of a bonding strength between the thermoplastic polymer and the current collector, reducing the risk of peeling-off of the second insulating layer.

In a possible implementation, in the second insulating layer, a mass ratio A:B of the thermoplastic polymer to the binder is 55:45 to 75:25; and optionally, in the second insulating layer, the mass ratio A:B of the thermoplastic polymer to the binder is 65:35 to 75:25.

In the above technical solution, a proper setting of the mass ratio of the thermoplastic polymer to the binder in the second insulating layer is advantageous to the reduction of the risk of peeling-off of the second insulating layer, and also advantageous to the formation of the uniform, dense first insulating layer on the end surface of the exposed current collector and on the burr.

In a possible implementation, a resistance R of the end surface provided with the first insulating layer satisfies $R \geq 100\Omega$, and optionally, a resistance R of the end surface provided with the first insulating layer satisfies $R \geq 2000\Omega$. The resistance at the end surface satisfies the above condition. In this way, the risk of a short circuit of the battery cell caused by the end surface overlapping an electrode of opposite polarity may be reduced.

In a possible implementation, the secondary insulating layer has a thickness d2 of 20 μm to 50 μm; and optionally, the thickness d2 of the secondary insulating layer is 20 μm to 30 μm.

In the above technical solution, in the case where the thickness d2 of the second insulating layer is not less than 20 μm, there is a large amount of thermoplastic polymer in the second insulating layer in the process of cutting the current collector provided with the second insulating layer, and thus the large amount of thermoplastic polymer may flow to the burr and the exposed end surface of the current collector after being heated, which is advantageous to uniform, dense coating of the exposed end surface and the burr; and the case where the thickness d2 of the second insulating layer is not greater than 50 μm is advantageous to the reduction of energy consumed in the cutting process. Alternatively, the secondary insulating layer has a thickness d2 of 20 μm to 30 μm, so as to reduce the energy consumed by cutting, and improve the effect of coating the exposed end surface and the burr.

In a possible implementation, the first insulating layer has a thickness d1 of 200 nm to 2000 nm. In this way, the first insulation layer can coat the burr and the exposed end surface with a small thickness. Optionally, the thickness d1 of the first insulating layer is 200 nm to 500 nm, which is advantageous to further reduction of the thickness of the first insulating layer while the burr and the exposed end surface are well coated.

In a possible implementation, the second insulating layer includes a first portion and a second portion, the first portion is provided on a surface of the transition region, and the second portion extends from the first portion and is provided on a part of a surface of the tab. In this way, the risk of the tab overlapping an electrode of opposite polarity can be reduced. In addition, by providing the first thermoplastic polymer and the second thermoplastic polymer, the risk of the second portion of the second insulating layer contracting in a direction away from the cutting line can also be reduced.

In a possible implementation, in a second direction, the first insulating layer is provided on end surfaces of two ends of a region of the tab provided with the second portion, and the second direction is different from the first direction; and optionally, the second direction is perpendicular to the first direction. In this way, the first insulating layer may coat the end surface of the tab exposed by cutting, and the risk of the end surface overlapping an electrode of opposite polarity can be reduced.

In a possible implementation, a material of the first insulating layer is the same as the material of the thermoplastic polymer in the second insulating layer. In this way, it is advantageous to the simplification of preparation steps for the electrode sheet, thereby speeding up the production.

In a possible implementation, a thermoplastic polymer in the first insulating layer is in the shape of a film layer, and the thermoplastic polymer in the second insulating layer includes a thermoplastic polymer in the shape of a film layer and a thermoplastic polymer in the shape of a particle. In this way, the first insulating layer is formed by melting and then solidifying the thermoplastic polymer in the second insulating layer. In this way, it is advantageous to the simplification of preparation steps for the electrode sheet, and the first insulating layer may be formed at the same time as cutting.

In a possible implementation, the current collector includes a metal foil sheet or a composite current collector; optionally, the metal foil sheet includes aluminum foil or copper foil; optionally, the composite current collector includes a polymer material base layer and a metal layer on at least one surface of the polymer material base layer; and optionally, the current collector includes aluminum foil. In this way, it is advantageous to the selection of an appropriate current collector according to practical needs. In the case where the current collector includes aluminum foil, the electrode sheet is a positive electrode sheet, which is advantageous to the reduction of the risk of the positive electrode sheet overlapping a negative electrode sheet, thereby facilitating the improvement of the reliability of the battery cell. In addition, it is also advantageous to the reduction of the risk of the positive electrode sheet overlapping a lithium dendrite extracted from the negative electrode sheet.

In a possible implementation, the first insulating layer is further provided on an end surface of the body portion at a second end, and the second end is opposite the first end in the first direction. In this way, the first insulating layer is provided on both the end surface at the first end and the end surface at the second end of the body portion, which is advantageous to further reduction of the risk of a short circuit of the battery cell.

According to a second aspect, there is provided a preparation method for an electrode sheet, including: providing a current collector; coating a first region of the current collector with an active material to form an active material layer; coating a second region of the current collector with an insulating paste to form a second insulating layer, where the insulating paste includes a thermoplastic polymer and a binder, the thermoplastic polymer includes a first thermoplastic polymer and a second thermoplastic polymer, the first thermoplastic polymer has a volume particle size distribution $D_V50$ of 1 μm to 5 μm, and the second thermoplastic polymer has a volume particle size distribution $D_V50$ of 20 μm to 50 μm; and cutting the current collector provided with the second insulating layer along a cutting line, where at least part of the cutting line is provided in the second region.

In the above technical solution, the first insulating layer is provided at an end surface of the electrode sheet prepared by the above method, which is advantageous to the formation of the uniform, dense second insulating layer in a transition region, thereby facilitating the improvement of the reliability of the battery cell.

In a possible implementation, the second thermoplastic polymer has a volume particle size distribution $D_V50$ of 20 μm to 40 μm.

In a possible implementation, in the second insulating layer, a mass ratio m1:m2 of the first thermoplastic polymer to the second thermoplastic polymer is 1:1 to 3:1; and optionally, the mass ratio m1:m2 of the first thermoplastic polymer to the second thermoplastic polymer is 1:1 to 2:1.

In a possible implementation, a drop melting point of the thermoplastic polymer is 80° C. to 220° C.; and optionally, the drop melting point of the thermoplastic polymer is 150° C. to 220° C.

In a possible implementation, a material of the thermoplastic polymer includes at least one of a crystalline thermoplastic polymer and an amorphous thermoplastic polymer; optionally, the crystalline thermoplastic polymer includes at least one of polyethylene, polypropylene, and polyamide; and optionally, the amorphous thermoplastic polymer includes at least one of microcrystalline wax, polystyrene, and polymethyl methacrylate.

In a possible implementation, in the insulating paste, a mass ratio A:B of the thermoplastic polymer to the binder is 55:45 to 75:25; and optionally, in the second insulating layer, the mass ratio A:B of the thermoplastic polymer to the binder is 65:35 to 75:25.

In a possible implementation, the secondary insulating layer has a thickness d2 of 20 μm to 50 μm; and optionally, the thickness d2 of the secondary insulating layer is 20 μm to 30 μm.

In a possible implementation, the cutting the current collector provided with the second insulating layer along a cutting line includes: controlling a laser processing tool to cut the current collector provided with the second insulating layer along the cutting line.

In the above technical solution, the current collector is cut by means of a laser, and much heat may be generated in the cutting process, which is advantageous to the transformation of the thermoplastic polymer in the second insulating layer into a flowable state and flowing to the end surface, thereby facilitating the formation of the first insulating layer.

According to a third aspect, there is provided a battery cell including the electrode sheet according to the first aspect and any one of the possible implementations in the first aspect.

According to a fourth aspect, there is provided a battery including the battery cell according to the third aspect.

According to a fifth aspect, there is provided an electric device including the battery according to the fourth aspect.

DESCRIPTION OF DRAWINGS

In order to more clearly illustrate the technical solutions of the embodiments of the present application, the drawings required to be used in the embodiments of the present application will be briefly introduced below. Obviously, the drawings described below are only some embodiments of the present application. For persons of ordinary skill in the art, other drawings can also be obtained from the drawings without creative work.

REFERENCE SIGNS

Figure 1:
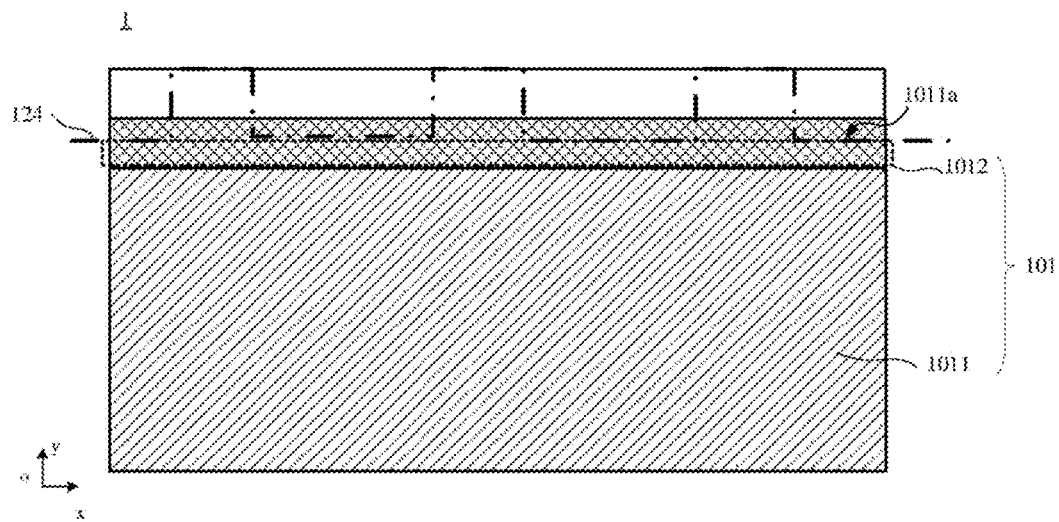
FIG. 1 is a schematic diagram of an electrode sheet before tab processing according to an embodiment of the present application.

1—electrode sheet; 124—cutting line; 10—current collector; 11—active material layer; 121—first insulating layer; 122—second insulating layer; 101—body portion; 102—tab; 1011—coated region; 1012—transition region; 1011a—end surface; 1221—first portion; 1222—second portion.

DETAILED DESCRIPTION

The embodiments of the electrode sheet and preparation method therefor, the battery cell, the battery, and the electrical device of the present application are described below in detail with reference to the drawings as appropriate. However, an unnecessary detailed description may be omitted. For example, a detailed description of well-known matters and repeated descriptions of a substantially same structure may be omitted. This is to avoid the following descriptions from becoming unnecessarily redundant and to facilitate understanding by those skilled in the art. The accompanying drawings and the following descriptions are provided for those skilled in the art to fully understand this application, and are not intended to limit subject matters described in the claims.

The "range" disclosed in this application is limited in the form of a lower limit and an upper limit. A given range is limited by selecting a lower limit and an upper limit, which define the boundaries of the specific range. A range defined in this manner may include an end value or may not include an end value, and may be any combination, that is, any lower limit may be combined with any upper limit to form a range. For example, if the ranges of 60-120 and 80-110 are listed for a specific parameter, it is understood that the ranges of 60-110 and 80-120 are also expected. In addition, if the minimum range values of 1 and 2 are listed, and if the maximum range values of 3, 4, and 5 are listed, the following ranges may all be expected: 1-3, 1-4, 1-5, 2-3, 2-4, and 2-5. In this application, unless otherwise stated, a numerical range "a-b" represents a shorthand representation for a combination of any real numbers between a and b, where both a and b are real numbers. For example, the numerical range of "0-5" represents that all real numbers between "0-5" have been listed herein, and "0-5" is only a shortened representation of these numerical combinations. In addition, when a parameter is expressed as an integer ≥2, it is equivalent to disclosing that the parameter is an integer such as 2, 3, 4, 5, 6, 7, 8, 9, 10, 11, or 12.

Unless otherwise specified, all embodiments and optional embodiments of this application may be combined with each other to form new technical solutions.

Unless otherwise specified, all technical features and optional technical features of this application can be combined with each other to form new technical solutions.

Unless otherwise specified, all steps in this application may be performed sequentially or randomly, preferably sequentially. For example, the method comprises steps (a) and (b), meaning that the method may comprise steps (a) and (b) performed sequentially or steps (b) and (a) performed sequentially. For example, the mentioned method may further comprise step (c), meaning that step (c) may be added to the method in any order, e.g. the method may comprise steps (a), (b) and (c), or steps (a), (c) and (b), or steps (c), (a) and (b), etc.

Unless otherwise specified, the terms "including" and "containing" as used herein are meant to be open. For example, the "including" and "containing" may include or contain other components not listed.

In the present application, the term "and/or" is inclusive, unless specifically stated otherwise. For example, the phrase "A and/or B" means "A, B, or both A and B". More specifically, the condition "A or B" is satisfied by either A being true (or present) and B being false (or absent), A being false (or absent) and B being true (or present), or both A and B being true (or present).

In the development of battery technologies, various design factors, such as energy density, cycle life, discharge capacity, charge/discharge rate, and reliability, are simultaneously taken into consideration. The design of an electrode sheet in a battery cell is critical to the reliability of the battery cell. The electrode sheet generally includes a current collector as well as an active material layer and an insulating layer coating different regions of the current collector. After the current collector is coated with the corresponding active material layer and insulating layer, the current collector coated with the active material layer and the insulating layer needs to be cut to form a tab by cutting. In a cutting process, dust and burrs are easy to generate, and the burrs may cause the electrode sheet to overlap an electrode of opposite polarity, thereby causing a short circuit.

In some processing manners, the insulating layer coating the current collector is set as a ceramic coating to reduce burrs generated in the cutting process. However, such a processing manner can only reduce the number of burrs, a burr may still be present after cutting, and the burr may cause the electrode sheet to overlap an electrode of opposite polarity, resulting in an adverse effect. In addition, an end surface of the current collector is exposed after cutting, and there is a risk of the exposed end surface overlapping an electrode of opposite polarity, which may cause a short circuit of the battery cell, which is disadvantageous to the improvement of the reliability of the battery.

In order to further improve the reliability of the battery cell, a specific region of the current collector is coated with an insulating layer including a thermoplastic polymer. A cutting line is located in a region where the insulating layer is located. In the process of cutting the current collector to prepare the tab, the thermoplastic polymer in the insulating layer is transformed from a solid state into a flowable state after being heated, and the thermoplastic polymer in the flowable state easily flows toward a region with a low temperature, for example, toward a region close to the active material layer, causing the insulating layer to contract toward the region close to the active material layer. As a result, after cutting for the tab, the insulating layer is not sufficiently uniform or dense, and a region that should be coated with the insulating layer is provided with no insulating layer. When the region overlaps an electrode of opposite polarity, a defect such as a short circuit easily occurs, which is disadvantageous to the improvement of the reliability of the battery cell.

In view of this, the present application provides an electrode sheet. In the electrode sheet, a specific region of the current collector is coated with an insulating layer including a first thermoplastic polymer and a second thermoplastic polymer, where the first thermoplastic polymer has a volume particle size distribution $D_v50$ of 1 μm to 5 μm, and the second thermoplastic polymer has a volume particle size distribution $D_v50$ of 20 μm to 50 μm. In this way, through cooperation between the first thermoplastic polymer and the second thermoplastic polymer, a contraction distance of the insulating layer may be reduced, which is advantageous to the improvement of uniformity and density of the insulating layer, making it possible to reduce the risk of the specific region of the current collector overlapping an electrode of opposite polarity due to a non-uniform second insulating layer, thereby improving the reliability of the battery cell.

[Electrode Sheet]

Figure 2:
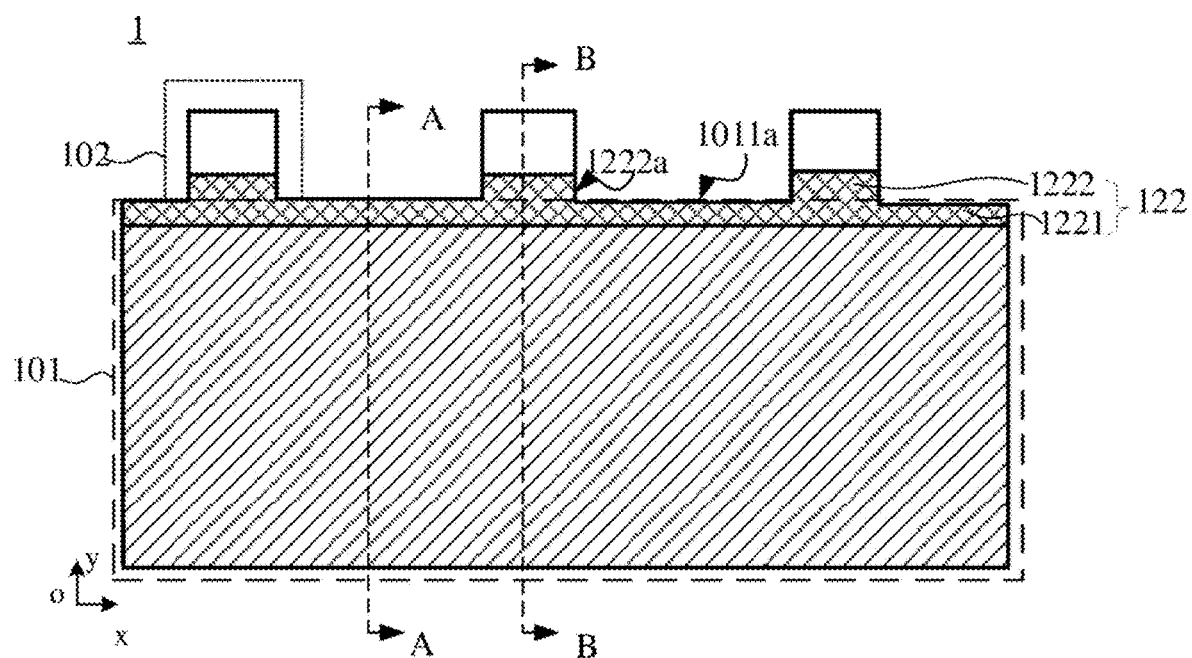
FIG. 2 is a schematic diagram of an electrode sheet according to an embodiment of the present application.
Figure 3:
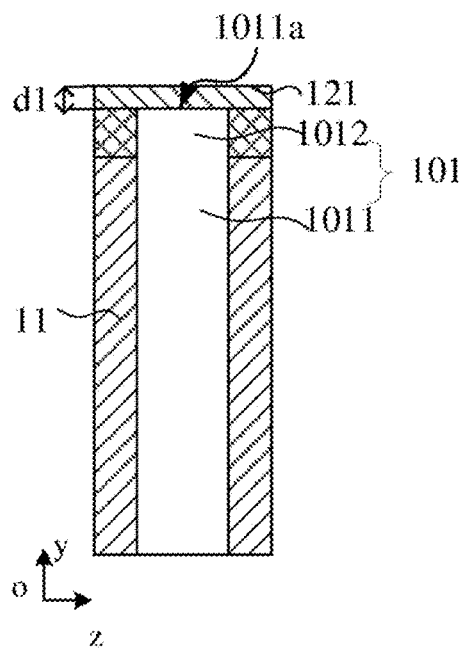
FIG. 3 is a sectional view along line A-A in FIG. 2.
Figure 4:
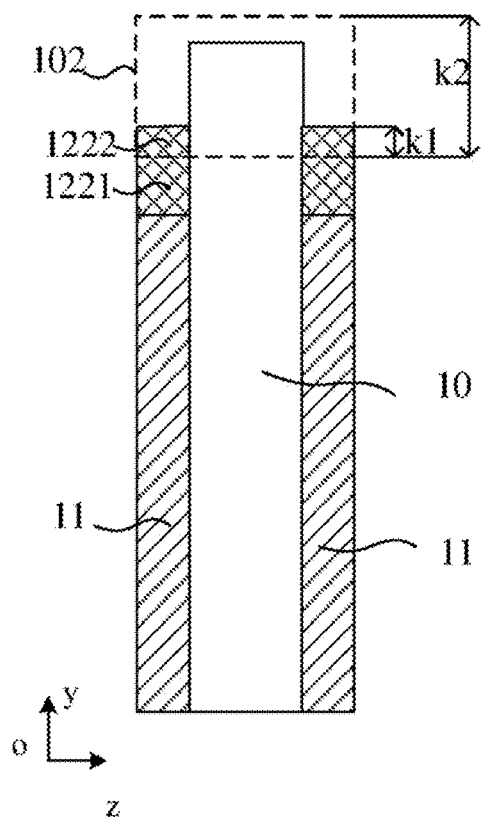
FIG. 4 is a sectional view along line B-B in FIG. 2.

FIG. 1 is a schematic diagram of an electrode sheet before tab processing according to an embodiment of the present application. FIG. 2 is a schematic diagram of an electrode sheet according to an embodiment of the present application. FIG. 3 is a sectional view along line A-A in FIG. 2. FIG. 4 is a sectional view along line B-B in FIG. 2.

Referring to FIGS. 1 and 2, FIG. 1 is a schematic diagram of an electrode sheet before tab processing, and FIG. 2 is a schematic diagram of an electrode sheet after tab processing. As shown in FIG. 1, a black dashed line 124 is a cutting line for tab cutting, and an electrode sheet 1 as shown in FIG. 2 is obtained after cutting along the cutting line 124.

Referring to FIGS. 1 to 4, the electrode sheet 1 includes a current collector 10, an active material layer 11, a first insulating layer 121, and a second insulating layer 122.

The current collector 10 has two surfaces opposite each other in a thickness direction thereof, and the active material layer 11 may be provided on at least one of the two surfaces opposite each other in the thickness direction of the current collector 10. For example, as shown in FIGS. 3 and 4, both of the two surfaces opposite each other in the thickness direction of the current collector 10 are provided with the active material layer 11.

The thickness direction of the current collector 10 may be a z direction shown in FIGS. 3 and 4.

The current collector 10 includes a body portion 101 and a tab 102, where the tab 102 extends from a first end of the body portion 101, and the first end of the body portion 101 is an end of the body portion 101 in a first direction.

The first direction is parallel to a plane where the current collector 10 is located, and is a direction in which the tab 102 protrudes with respect to the body portion 101. For example, the first direction is a y direction in FIG. 2.

The body portion 101 includes a coated region 1011 and a transition region 1012 provided between the coated region 1011 and the tab 102.

The active material layer 11 is provided on a surface of the coated region 1011. For example, as shown in FIGS. 3 and 4, the active material layer 11 is provided on both of the surfaces of the current collector 10 in the thickness direction. In some embodiments, the active material layer 11 may be provided on one of the two surfaces of the current collector 10 in the thickness direction.

The first insulating layer 121 is provided on an end surface 1011a of the body portion 101 at the first end.

The end surface 1011a of the body portion 1011 at the first end is a surface parallel to the thickness direction of the current collector 10. For example, as shown in FIG. 3, the end surface 1011a is a surface parallel to the x direction and the z direction.

The end surface 1011a of the body portion 101 at the first end may be formed by the following process: referring to FIG. 1, cutting the current collector 10 along the cutting line 124, where the end surface 1011a is an end surface of the transition region 1012 after cutting. After cutting, the current collector 10 at the end surface 1011a is exposed, and a burr may be generated.

By providing the first insulating layer 121 at the end surface 1011a, the first insulating layer 121 can coat the burr generated in the cutting process, reducing the risk of the burr overlapping an electrode of opposite polarity. For example, after the electrode sheet 1 and an electrode sheet of opposite polarity (for example, the electrode sheet 1 is a positive electrode sheet and the electrode sheet of opposite polarity is a negative electrode sheet) are assembled into an electrode assembly by means of winding or lamination, and the electrode assembly, an end cover assembly, and a housing are assembled into a battery cell, the burr may overlap an electrode sheet of opposite polarity. By providing the first insulating layer 121, the first insulating layer 121 can coat the burr, thereby reducing the risk of the burr overlapping an electrode of opposite polarity.

By providing the first insulating layer 121 at the end surface 1011a, the first insulating layer 121 can coat the exposed end surface 1011a of the current collector 10 after cutting, thereby reducing the risk of the end surface 1011a overlapping an electrode of opposite polarity. For example, if the electrode sheet 1 is a positive electrode sheet, the first insulating layer 121 may be provided to reduce the risk of an internal short circuit of the battery cell caused by the electrode sheet 1 overlapping a negative electrode sheet.

At least part of the second insulating layer 122 is provided on a surface of the transition region 1012. That is, the surface of the transition region 1012 is provided with the second insulating layer 122, and in addition to the transition region 1012, other regions of the current collector 10 may also be provided with the second insulating layer 122. The provision of the second insulating layer 122 in the transition region 1012 is advantageous to the reduction of the risk of the electrode sheet 1 overlapping an electrode sheet 1 of opposite polarity.

The second insulating layer 122 includes a thermoplastic polymer including a first thermoplastic polymer and a second thermoplastic polymer, where the first thermoplastic polymer has a volume particle size distribution $D_V50$ of 1 μm to 5 μm, and the second thermoplastic polymer has a volume particle size distribution $D_V50$ of 20 μm to 50 μm.

The thermoplastic polymer may refer to a polymer that softens after being heated, solidifies when being cooled, and can soften again. For example, when heated to a temperature, the thermoplastic polymer is transformed from a solid particle into a flowable state, and after cooled, it may be transformed into a thermoplastic polymer in the shape of a layer or film layer.

The thermoplastic polymer in the second insulating layer 122 is transformed from a solid state into a flowable state when heated to a condition. In this way, in the process of cutting the current collector 10 provided with the second insulating layer 122, the thermoplastic polymer in the flowable state may flow to the burr and the exposed end surface 1011a, and after the temperature is reduced, the thermoplastic polymer in the flowable state solidifies at the burr and the exposed end surface 1011a to coat the burr and the exposed end surface 1011a, thereby reducing the risk of the burr and the exposed end surface 1011a overlapping an electrode of opposite polarity.

The first thermoplastic polymer may have a volume particle size distribution $D_V50$ of 1 μm, 3 μm, 5 μm, or any numerical value within the range above. and the second thermoplastic polymer may have a volume particle size distribution $D_V50$ of 20 μm, 25 μm, 30 μm, 35 μm, 40 μm, 45 μm, 50 μm, or any numerical value within the range above.

Materials of the first thermoplastic polymer and the second thermoplastic polymer may be the same. That is, the first thermoplastic polymer differs from the second thermoplastic polymer in particle sizes.

The first thermoplastic polymer and the second thermoplastic polymer may refer to two types of particles with different volume particle size distributions that are added in the process of preparing a paste of the second insulating layer 122. In the process of preparing the second insulating layer 122, the volume particle size distributions of the first thermoplastic polymer and the second thermoplastic polymer may be measured by a laser particle size analyzer.

After cutting for the tab 102, the particle sizes of the first thermoplastic polymer and the second thermoplastic polymer may be measured by the following method. The electrode sheet 1 is observed using a scanning electron microscope (SEM), and a partial region of the second insulating layer 122 close to the active material layer 11 is selected for measurement (in the partial region close to the active material layer 11, the thermoplastic polymer in the second insulating layer 122 is not melted and still remains the shape of a particle). In a specific region, the volume particle size distribution of the first thermoplastic polymer and the volume particle size distribution of the second thermoplastic polymer are estimated based on the number of particles and a particle size of each particle (the paste of the second insulating layer is a uniformly mixed paste).

The volume particle size distribution $D_V50$ may refer to a corresponding particle size when a cumulative volume distribution percentage of a sample reaches 50%.

In the cutting process for the tab 102, the thermoplastic polymer in the second insulating layer 122 transformed into the flowable state easily flows to a region with a low temperature. For example, the thermoplastic polymer in the second insulating layer 122 moves toward the region close to the active material layer 11. In this way, the second insulating layer 122 in the transition region 1012 may flow in a direction away from the tab 102 (or close to the coated region 1011), making it difficult for the second insulating layer 122 to cover a partial region of the transition region 1012 away from the coated region 1011. A short circuit easily occurs when the partial region overlaps an electrode of opposite polarity, resulting in a fire, etc. For another example, the thermoplastic polymer in the second insulating layer 122 moves in a direction away from the cutting line 124, making it difficult for the second insulating layer 122 in a region of the tab 102 to cover a partial region of the tab 102 close to the cutting line 124. A short circuit easily occurs when the partial region overlaps an electrode of opposite polarity, resulting in a fire, etc.

Through cooperation between the second thermoplastic polymer having a larger particle size and the first thermoplastic polymer having a smaller particle size, in the cutting process for the tab 102, the second thermoplastic polymer having a larger particle size can increase a resistance to contraction of the second insulating layer 122 toward the region close to the active material layer 11, reducing a contraction distance of the second insulating layer 122, which is advantageous to the reduction of the risk of the transition region 1012 overlapping an electrode of opposite polarity. The first thermoplastic polymer having a small particle size melts quickly, compensating for the disadvantage of the second thermoplastic polymer having a large particle size melting slowly, which is advantageous to the formation of the uniform, dense first insulating layer 121 on the end surface 1011a.

In the case where the particle size of the thermoplastic polymer is excessively small, when the thermoplastic polymer is prepared into a paste to coat the current collector 10, the thermoplastic polymer is non-uniformly distributed and may easily agglomerate. In the case where the volume particle size distribution $D_V50$ of the first thermoplastic polymer is not less than 1 μm, the risk of agglomeration of the first thermoplastic polymer can be reduced.

In the case where the volume particle size distribution $D_V50$ of the first thermoplastic polymer is not greater than 5 μm, the first thermoplastic polymer has an appropriate flow path, which is advantageous to the improvement of uniformity and density of the first insulating layer 121.

In the case where the volume particle size distribution $D_V50$ of the second thermoplastic polymer is not less than 20 μm, it is advantageous to further reduction of the contraction of the second insulating layer 122. In the case where the volume particle size distribution $D_V50$ of the second thermoplastic polymer is not greater than 50 μm, the second thermoplastic polymer has an appropriate flow path, which is advantageous to the improvement of uniformity and density of the first insulating layer 121.

Therefore, by setting the particle sizes of the first thermoplastic polymer and the second thermoplastic polymer in appropriate ranges, the agglomeration of the first thermoplastic polymer in the process of preparing the second insulating layer 122 may be reduced, and the second thermoplastic polymer is caused to have an appropriate flow path, thereby facilitating the formation of the uniform, dense first insulating layer 121 on the end surface 1011a.

An embodiment of the present application provides an electrode sheet 1 including a current collector 10, an active material layer 11, a first insulating layer 121, and a second insulating layer 122. The current collector 10 includes a body portion 101 and a tab 102, where the tab 102 extends from a first end of the body portion 101, and the first end of the body portion 101 is an end of the body portion 101 in a first direction. The body portion 101 includes a coated region 1011 and a transition region 1012 provided between the coated region 1011 and the tab 102, where the coated region 1011 is provided with the active material layer 11. In this way, by providing the transition region 1012, there may be a distance between a cutting tool (such as a laser) and the active material layer 11 in a cutting process for the tab 102, thereby reducing peeling-off of the active material layer 11. The first insulating layer 121 is provided on an end surface 1011a of the body portion 101 at the first end, so that the first insulating layer 121 can coat the end surface 1011a of the first end to reduce the risk of exposing the current collector at the end surface 1011a, thereby reducing the risk of the current collector 10 exposed at the end surface 1011a overlapping an electrode of opposite polarity. Moreover, the first insulating layer 121 can also coat a burr generated by the cutting process, thereby reducing the risk of the burr overlapping an electrode of opposite polarity. At least part of the second insulating layer 122 is provided on a surface of the transition region 1012, and the second insulating layer 122 includes a first thermoplastic polymer and a second thermoplastic polymer. In this way, a cutting line is located in the transition region 1012. In the cutting process for the tab 102, the thermoplastic polymer in the second insulating layer 122 on the surface of the transition region 1012 is transformed from a solid state into a flowable state after being heated, and the thermoplastic polymer in the flowable state flows to the end surface 1011a of the first end and solidifies at the end surface 1011a after cooled. The first thermoplastic polymer has a volume particle size distribution $D_V50$ of 1 μm to 5 μm, and the second thermoplastic polymer has a volume particle size distribution $D_V50$ of 20 μm to 50 μm. A proper setting of particle sizes of the first thermoplastic polymer and the second thermoplastic polymer is advantageous to the formation of the uniform, dense first insulating layer 121 and second insulating layer 122. Therefore, the technical solution of this embodiment of the present application can improve the uniformity and density of the first insulating layer 121 and the second insulating layer 122, which is advantageous to further improvement of the reliability of the battery cell.

In some embodiments, the second thermoplastic polymer has a volume particle size distribution $D_V50$ of 20 μm to 40 μm. In this way, after being heated and then transformed from the solid state into the flowable state, the second thermoplastic polymer has an appropriate flow path, which is advantageous to the formation of the uniform, dense first insulating layer 121 on the end surface.

In some embodiments, in the second insulating layer 122, a mass ratio m1:m2 of the first thermoplastic polymer and the second thermoplastic polymer is 1:1 to 3:1. For example, m1:m2 is 1:1, 2:1, 3:1, 1.3:1, or any numerical value within the range above.

In the case where the mass ratio m1:m2 of the first thermoplastic polymer and the second thermoplastic polymer is not less than 1:1, there is an appropriate amount of first thermoplastic polymer in the second insulating layer 122, which is advantageous to the improvement of the uniformity and density of the first insulating layer 121.

In the case where the mass ratio m1:m2 of the first thermoplastic polymer and the second thermoplastic polymer is not greater than 3:1, there is an appropriate amount of second thermoplastic polymer in the second insulating layer 122, which is advantageous to the reduction of the risk of the second insulating layer 122 contracting toward the coated region 1011.

Optionally, the mass ratio m1:m2 of the first thermoplastic polymer and the second thermoplastic polymer is 1:1 to 2:1. By properly setting the mass ratio of the first thermoplastic polymer to the second thermoplastic polymer, a distance by which the second insulating layer 122 contracts toward the coated region 1011 may be further reduced.

In some embodiments, a drop melting point of the thermoplastic polymer is 80° C. to 220° C. For example, the drop melting point of the thermoplastic polymer is 80° C., 100° C., 150° C., 200° C., 220° C., or any numerical value within the range above.

The drop melting point of the thermoplastic polymer is not less than 80° C. In this way, the risk of the thermoplastic polymer melting or flowing due to heating of the electrode sheet 1 in other processing processes may be reduced. The drop melting point of the thermoplastic polymer is not greater than 220° C. In this way, the risk of failing to transform the thermoplastic polymer into the flowable state in the cutting process may be reduced, thereby reducing the risk of failing to form the first insulating layer 121 on the end surface 1011a.

The drop melting point of the thermoplastic polymer is a temperature at which the thermoplastic polymer is transformed from a solid or semi-solid state into a liquid state.

In the process of cutting the current collector 10 provided with the second insulating layer 122, the thermoplastic polymer is transformed from a solid state into a flowable state under the action of heat generated by cutting, and the thermoplastic polymer in the flowable state may flow to the end surface 1011a of the current collector 10 exposed after the cutting and a burr generated by the cutting, thereby facilitating the preparation of the first insulating layer 121.

Optionally, the drop melting point of the thermoplastic polymer is 150° C. to 220° C. In this way, the risk of transforming the thermoplastic polymer into a flowable state by other factors in a process without cutting the current collector 10 can be reduced.

In some embodiments, a material of the thermoplastic polymer includes at least one of a crystalline thermoplastic polymer and an amorphous thermoplastic polymer; optionally, the crystalline thermoplastic polymer includes at least one of polyethylene, polypropylene, and polyamide; and optionally, the amorphous thermoplastic polymer includes at least one of microcrystalline wax, polystyrene, and polymethyl methacrylate.

A drop melting point of the crystalline thermoplastic polymer may refer to a melting point of the crystalline thermoplastic polymer. A drop melting point of the amorphous thermoplastic polymer may refer to a glass transition temperature of the amorphous thermoplastic polymer.

In the above technical solution, the use of the thermoplastic polymer is advantageous to the formation of a uniform, dense coating on the end surface 1011a of the current collector 10 exposed after cutting and on the burr. Moreover, the thermoplastic polymer has high insulation and pressure resistance. When the electrode sheet 1 is immersed in an electrolyte, the thermoplastic polymer does not electrochemically react with the electrolyte.

In some embodiments, the material of the second insulating layer 122 further includes a binder.

The provision of the binder in the second insulating layer 122 is advantageous to the bonding of the thermoplastic polymer to the transition region 1012, which can reduce the risk of the second insulating layer 122 peeling off from the transition region 1012.

In some embodiments, in the second insulating layer 122, a mass ratio A:B of the thermoplastic polymer to the binder is 55:45 to 75:25. For example, A:B is 55:45, 60:40, 65:35, 70:30, 75:25, or any numerical value within the range above.

In the above technical solution, a proper setting of the mass ratio of the thermoplastic polymer to the binder in the second insulating layer 122 is advantageous to the reduction of the risk of peeling-off of the second insulating layer 122, and also advantageous to the formation of the uniform, dense first insulating layer 121 on the end surface 1011a of the exposed current collector 10 and on the burr.

Alternatively, in the second insulating layer 122, the mass ratio A:B of the thermoplastic polymer to the binder is 65:35 to 75:25.

In some embodiments, a resistance R of the end surface 1011a provided with the first insulating layer 121 satisfies R≥100Ω. For example, R is 100 Ω, 500Ω, or 1000Ω.

In the case where the resistance of the end surface 1011a is greater than 100Ω, even if the end surface 1011a overlaps an electrode of opposite polarity in some extreme cases, an internal short circuit of the battery cell does not occur since the end surface 1011a has a resistance, thereby reducing the risk of a fire, or even an explosion, etc. caused by the internal short circuit.

Alternatively, the resistance R of the end surface 1011a provided with the first insulating layer 121 satisfies R≥2000Ω. For example, R is 200 Ω, 5000Ω, or infinity. In this way, the risk of the internal short circuit of the battery cell may be further reduced.

In some embodiments, the second insulating layer 122 has a thickness d2 of 20 μm to 50 μm. For example, d2 is 20 μm, 25 μm, 30 μm, 40 μm, 45 μm, 50 μm, or any numerical value within the range above.

The thickness d2 of the second insulating layer 122 refers to a thickness on a side surface of the current collector 10. In the electrode sheet 1, a total thickness of the second insulating layer 122 in a thickness direction of the electrode sheet 1 is 40 μm to 100 μm.

The thickness d2 of the second insulating layer 122 is an average thickness of the second insulating layer 122 in the thickness direction of the current collector 10. For example, the thickness d2 is an average of a maximum dimension and a minimum dimension in the first direction.

In the case where the thickness d2 of the second insulating layer 122 is not less than 20 μm, there is a large amount of thermoplastic polymer in the second insulating layer 122 in the process of cutting the current collector 10 provided with the second insulating layer 122, and thus the large amount of thermoplastic polymer may flow to the burr and the exposed end surface 1011a of the current collector 10 after being heated, which is advantageous to uniform, dense coating of the exposed end surface 1011a and the burr.

The case where the thickness d2 of the second insulating layer 122 is not greater than 50 μm is advantageous to the reduction of energy consumed in the cutting process.

Alternatively, the secondary insulating layer 122 has a thickness d2 of 20 μm to 30 μm, so as to reduce the energy consumed by cutting, and improve the effect of coating the exposed end surface 1011a and the burr.

The thickness d2 of the second insulating layer 122 can be measured in the following manner: photographing the electrode sheet 1 using a scanning electron microscope (SEM) in the thickness direction of the electrode sheet 1, and measuring the thickness d2 of the second insulating layer 122 through an obtained picture.

In some embodiments, the first insulating layer 121 has a thickness d1 of 200 nm to 2000 nm. For example, d1 may be 200 nm, 300 nm, 400 nm, 500 nm, 800 nm, 1000 nm, 1500 nm, 2000 nm, or any numerical value within the range above.

The smaller the thickness d1 of the first insulating layer 121, the smaller a space occupied by the electrode sheet 1, which is advantageous to the improvement of a volume energy density of a battery cell. By setting the thickness d1 of the first insulating layer 121 to be 200 nm to 2000 nm, the first insulating layer 121 may well coat the burr and the exposed end surface 1011a with a small thickness, which is advantageous to further improvement of the performance of a battery cell.

The thickness d1 of the first insulating layer 121 is an average thickness of the first insulating layer 121 in the first direction. For example, the thickness d1 is an average of a maximum dimension and a minimum dimension in the first direction.

The thickness d1 of the first insulating layer 121 can be measured in the following manner: photographing the end surface 1011a of the electrode sheet 1 using a scanning electron microscope (SEM), and measuring the thickness d1 of the first insulating layer 121 through an obtained picture.

Optionally, the first insulating layer 121 has a thickness d1 of 200 nm to 500 nm. In this way, it is advantageous to further reduction of the thickness of the first insulating layer 121 while the burr and the exposed end surface 1011a are well coated.

In some embodiments, the second insulating layer 122 includes a first portion 1221 and a second portion 1222, where the first portion 1221 is provided on a surface of the transition region 1012, and the second portion 1222 extends from the first portion 1221 and is provided on a part of a surface of the tab 102. In this way, the risk of the tab 102 overlapping an electrode of opposite polarity can be reduced. In addition, by providing the first thermoplastic polymer and the second thermoplastic polymer, the risk of the second portion 1222 of the second insulating layer 122 contracting in a direction away from the cutting line 124 can also be reduced.

A partial region of the tab 102 is provided with the second portion 1222 of the second insulating layer 122, and the other region is provided with no second portion 1222. In this way, welding with the tab 102 and subsequent use of the battery cell are facilitated.

In some embodiments, in a second direction, the first insulating layer 121 is provided on end surfaces 1222a of two ends of a region of the tab 102 provided with the second portion 1222, and the second direction is different from the first direction.

In the case where the electrode sheet 1 includes a plurality of tabs 102, the second direction may be an arrangement direction of the plurality of tabs 102. For example, as shown in FIG. 2, the second direction is the x direction.

In the process of cutting the current collector 10 along the cutting line 124 to prepare the tab 102, the cutting tool passes through a region of the second portion 1222, and the end surface 1222a of the region in the second direction is exposed after cutting. By providing the first insulating layer 121 on the end surface 1222a, the risk of the end surface 1222a overlapping an electrode of opposite polarity may be reduced.

The first insulating layer 121 provided on the end surfaces 1222a of the two ends of the region of the second portion 1222 is formed in the process of cutting the current collector 10.

Optionally, the second direction is perpendicular to the first direction. In this way, the cutting for the tab 102 is facilitated.

In some embodiments, a material of the first insulating layer 121 is the same as the material of the thermoplastic polymer in second insulating layer 122. That is, the material of the first insulating layer 121 is the same as the material of the thermoplastic polymer in the second insulating layer 122. In this way, the first insulating layer 121 may be prepared in the cutting process for the tab 102, which is advantageous to the simplification of preparation steps for the electrode sheet 1, thereby speeding up the production.

In some embodiments, a thermoplastic polymer in the first insulating layer 121 is in the shape of a film layer, and the thermoplastic polymer in the second insulating layer 122 includes a thermoplastic polymer in the shape of a film layer and a thermoplastic polymer in the shape of a particle. In this way, the first insulating layer 121 is formed by melting and then solidifying the thermoplastic polymer in the second insulating layer 122. The thermoplastic polymer in the second insulating layer 122 flows to the end surface 1011a after being transformed into the flowable state, and solidifies at the end surface 1011a to form the first insulating layer 121. In this way, it is advantageous to the simplification of preparation steps for the electrode sheet 1, and the first insulating layer 121 may be formed at the same time as cutting for preparing the tab 102.

In the second insulating layer 122, at least part of the thermoplastic polymer in the shape of a particle is remained. In the first insulating layer 121, the thermoplastic polymer is in the shapes of a film layer and has almost no particle shape.

The thermoplastic polymer in the shape of a particle may have various shapes, e.g., a spherical shape, a rod shape, and a sheet shape. Here, the thermoplastic polymer in the shape of a particle means that the thermoplastic polymer is not transformed into the flowable state and is in the solid state.

Before cutting of the second insulating layer 122, the thermoplastic polymer in the second insulating layer 122 is in the shape of a particle. In the process of cutting the second insulating layer 122, a part of the thermoplastic polymer in the second insulating layer 122 is transformed from a solid state into a flowable state (e.g., a part of the thermoplastic polymer close to the cutting line 124 is transformed into the flowable state), and the other part of the thermoplastic polymer is still a solid particle.

In some embodiments, the current collector 10 includes a metal foil sheet or a composite current collector. In this way, setting a material of the current collector 10 according to practical needs is facilitated.

Optionally, the metal foil sheet includes aluminum foil or copper foil.

Optionally, the composite current collector includes a polymer material base layer and a metal layer on at least one surface of the polymer material base layer.

Optionally, the current collector includes aluminum foil. In this way, the electrode sheet 1 is a positive electrode sheet 1, which is advantageous to the reduction of the risk of the positive electrode sheet 1 overlapping a negative electrode sheet 1, thereby facilitating the improvement of the reliability of the battery cell. In addition, it is also advantageous to the reduction of the risk of the positive electrode sheet overlapping a lithium dendrite extracted from the negative electrode sheet.

In some embodiments, the first insulating layer 121 is further provided on an end surface of the body portion 101 at a second end, and the second end is opposite the first end in the first direction.

The body portion 101 has two opposite ends in the first direction, where the two ends are the first end and the second end, respectively. The tab 102 protrudes from the body portion 101 at the first end, and the second end is opposite the first end in the first direction.

The end surface at the second end and the end surface at the first end of the body portion 101 are both provided with the first insulating layer 121, which is advantageous to the reduction of the risk of an internal short circuit of the battery cell caused by the end surface at the first end and the end surface at the second end overlapping an electrode of opposite polarity, facilitating further improvement of the reliability of the battery cell.

The technical solution of the electrode sheet is described above with reference to FIGS. 1 to 4. A preparation method for an electrode sheet is described below with reference to FIG. 5, where reference may be made to the above for parts corresponding to the electrode sheet, and details are not described here again.

[Preparation Method for an Electrode Sheet]

Figure 5:
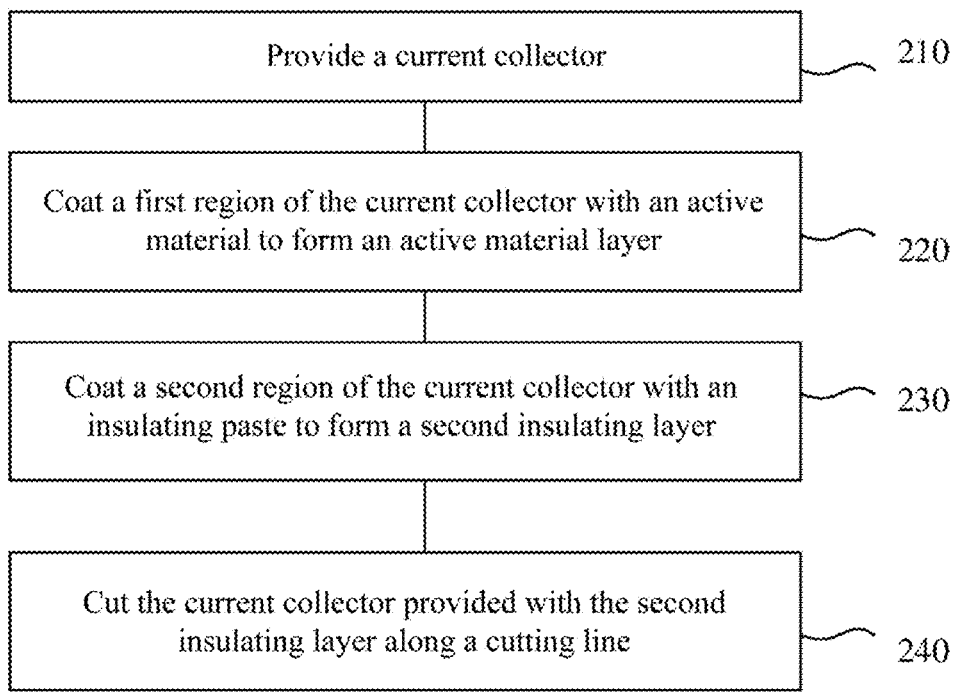
FIG. 5 is a schematic diagram of a preparation method for an electrode sheet according to an embodiment of the present application.

FIG. 5 is a schematic diagram of a preparation method for an electrode sheet according to an embodiment of the present application. The method 200 may be used to prepare the electrode sheet 1 in the embodiment above. The method 200 includes the following steps.

Step 210: Provide a current collector 10.

Figure 6:
FIG. 6 is a schematic diagram of a current collector according to an embodiment of the present application.

FIG. 6 is a schematic diagram of a current collector according to an embodiment of the present application. For example, as shown in FIG. 6, the current collector 10 is in the shape of a sheet or a rectangle. The shape and size of the current collector 10 may be set according to practical needs, and this embodiment of the present application includes, but is not limited to this.

Step 220: Coat a first region of the current collector 10 with an active material to form an active material layer 11.

Figure 7:
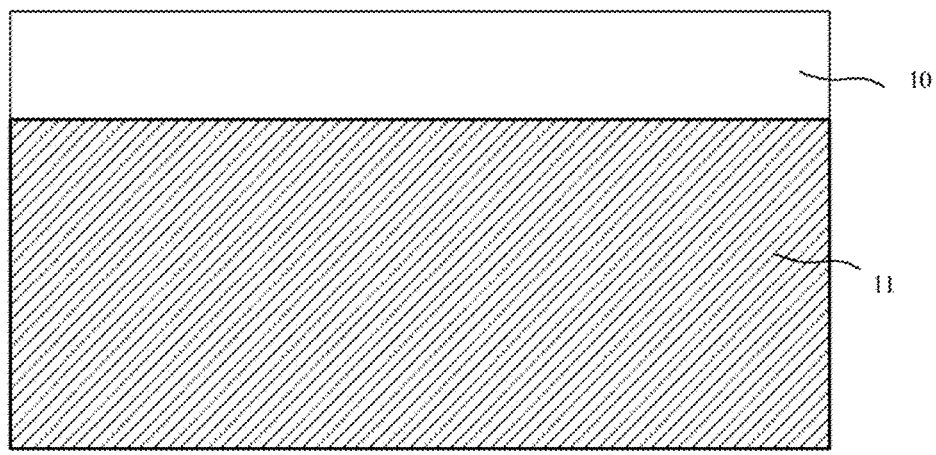
FIG. 7 is a schematic diagram of a current collector coated with an active material layer according to an embodiment of the present application.

FIG. 7 is a schematic diagram of a current collector coated with an active material layer according to an embodiment of the present application. As shown in FIG. 7, the first region of the current collector 10 is coated with the active material to obtain the current collector 10 provided with the active material layer 11.

The first region of the current collector 10 may be a region set according to practical needs. In this embodiment of the present application, the first region corresponds to the coated region 1011 of the body portion 101 of the electrode sheet 1.

Step 230: Coat a second region of the current collector 10 with an insulating paste to form a second insulating layer 122.

The insulating paste includes a thermoplastic polymer and a binder, the thermoplastic polymer includes a first thermoplastic polymer and a second thermoplastic polymer, the first thermoplastic polymer has a volume particle size distribution $D_V50$ of 1 μm to 5 μm, and the second thermoplastic polymer has a volume particle size distribution $D_V50$ of 20 μm to 50 μm.

Figure 8:
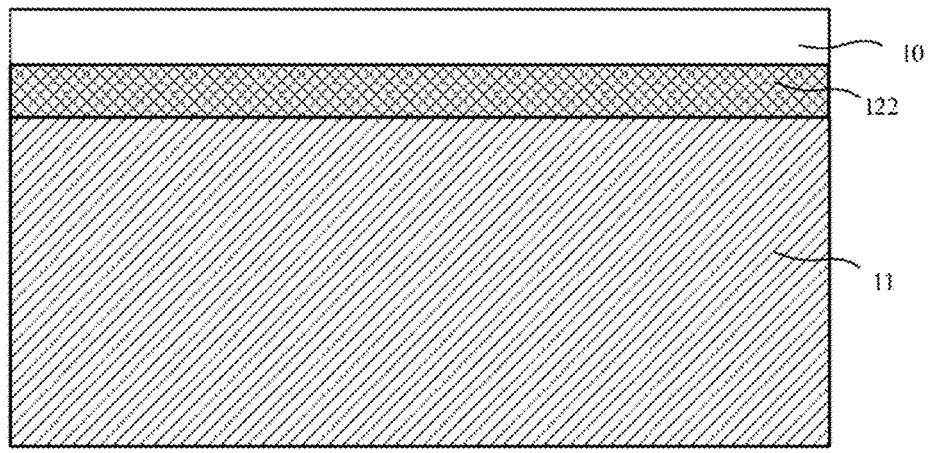
FIG. 8 is a schematic diagram of a current collector coated with a second insulating layer according to an embodiment of the present application.

FIG. 8 is a schematic diagram of a current collector coated with a second insulating layer according to an embodiment of the present application. As shown in FIG. 8, the second region of the current collector 10 is coated with the insulating paste to obtain the current collector 10 provided with the second insulating layer 122.

The size of the second region may be set according to practical needs. In this embodiment of the present application, the second region corresponds to the transition region 1012 of the body portion 101 of the electrode sheet 1 and a region of the tab 102 provided with the second insulating layer 122.

Step 240: Cut the current collector 10 provided with the second insulating layer 122 along a cutting line 124, where at least part of the cutting line 124 is provided in the second region.

Figure 9:
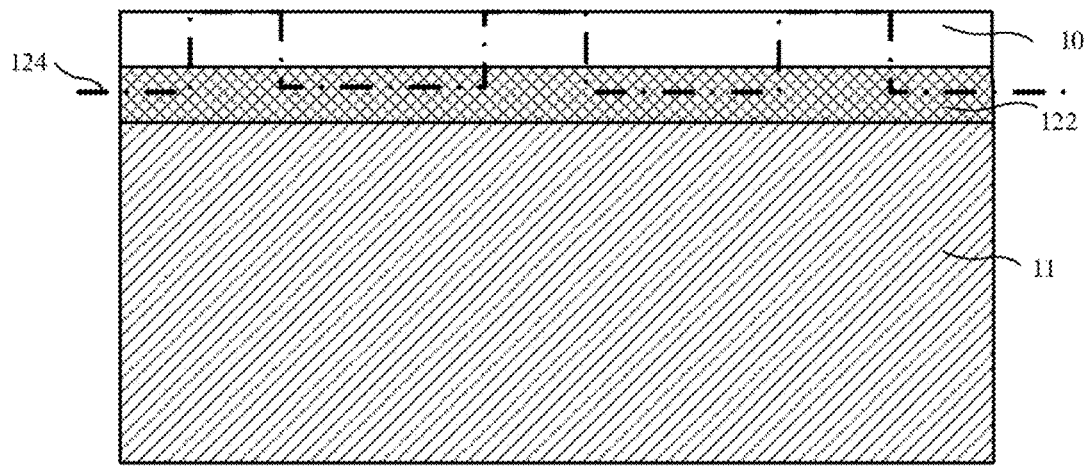
FIG. 9 is a schematic diagram of a current collector with a shown cutting line according to an embodiment of the present application.

FIG. 9 is a schematic diagram of a current collector with a shown cutting line according to an embodiment of the present application. As shown in FIG. 9, the current collector 10 is cut along the cutting line 124 to obtain the electrode sheet 1 shown in FIGS. 2 to 4.

In the above technical solution, by providing the second insulating layer 122, the first insulating layer 121 may be formed at the same time as cutting, which is advantageous to the simplification of preparation steps for the first insulating layer 121. The electrode sheet 1 prepared by the above method is applied to a battery cell, to cause the battery cell to have high reliability.

In some embodiments, the first thermoplastic polymer has a volume particle size distribution $D_V50$ of 1 μm to 5 μm, and the second thermoplastic polymer has a volume particle size distribution $D_V50$ of 20 μm to 40 μm.

In some embodiments, a mass ratio m1:m2 of the first thermoplastic polymer and the second thermoplastic polymer is 1:1 to 3:1.

Optionally, the mass ratio m1:m2 of the first thermoplastic polymer and the second thermoplastic polymer is 1:1 to 2:1.

In some embodiments, the second insulating layer 122 has a thickness d2 of 20 μm to 50 μm; and optionally, d2 is 20 μm to 30 μm.

In some embodiments, a drop melting point of the thermoplastic polymer is 80° C. to 220° C.; and optionally, the drop melting point of the thermoplastic polymer is 150° C. to 220° C.

In some embodiments, a material of the thermoplastic polymer includes at least one of a crystalline thermoplastic polymer and an amorphous thermoplastic polymer; optionally, the crystalline thermoplastic polymer includes at least one of polyethylene, polypropylene, and polyamide; and optionally, the amorphous thermoplastic polymer includes at least one of microcrystalline wax, polystyrene, and polymethyl methacrylate.

In some embodiments, in the insulating paste, a mass ratio A:B of the thermoplastic polymer to the binder is 55:45 to 75:25; and optionally, in the second insulating layer 122, the mass ratio A:B of the thermoplastic polymer to the binder is 65:35 to 75:25.

In some embodiments, step 240 includes: controlling a laser processing tool to cut the current collector 10 provided with the second insulating layer 122 along the cutting line. For example, the laser processing tool has a power of 200 W, a frequency of 200 kHz, and a feed speed of 30 m/min.

In this embodiment of the present application, use parameters of a laser may be adjusted according to the drop melting point of the thermoplastic polymer, the thickness of the second insulating layer 122, etc. For example, in the case where the drop melting point of the thermoplastic polymer is high or the second insulating layer 122 is thick, the power or frequency may be increased, or the feed speed may be decreased. For another example, a cutting parameter suitable for all cases (e.g., a thermoplastic polymer suitable for various drop melting points) may be selected for cutting the current collector 10.

In the above technical solution, a laser is used for cutting, and much heat may be generated in the cutting process, which is advantageous to the transformation of the thermoplastic polymer in the second insulating layer 122 into a flowable state and flowing to the end surface 1011a, thereby facilitating the formation of the first insulating layer 121.

[Positive Electrode Sheet]

The electrode sheet 1 in this embodiment of the present application may be a positive electrode sheet. The positive electrode sheet includes a positive electrode current collector and a positive electrode film layer provided on the positive electrode current collector.

The positive electrode current collector may be a metal foil sheet or a composite current collector. For example, the positive electrode current collector may be aluminum foil.

The composite current collector may include a polymer material base layer and a metal layer formed on at least one surface of the polymer material base layer. The composite current collector may be formed by forming a metal material (aluminum, an aluminum alloy, nickel, a nickel alloy, titanium, a titanium alloy, silver, a silver alloy, and the like) on a base material of a polymer material such as a base material of polypropylene (PP), polyethylene terephthalate (PET), polybutylene terephthalate (PBT), polystyrene (PS), polyethylene (PE), and the like.

The positive electrode film layer includes a positive electrode active material. The positive electrode active material may be a positive electrode active material for a battery commonly known in the art. For example, the positive electrode active material is lithium iron phosphate, a ternary material, a lithium-rich manganese-based material, etc. For example, the positive electrode active material is a ternary material, and particularly a ternary material of a high nickel system, such as $LiNi_{0.6}Co_{0.2}Mn_{0.2}O_2$ and $LiNi_{0.8}Co_{0.1}Mn_{0.1}O_2$.

The positive electrode film layer optionally further includes a binder. As an example, the binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylate resin.

The positive electrode film layer optionally further includes a conductive agent. The conductive agent may be selected from at least one of superconducting carbon, acetylene black, carbon black, Ketjen black, carbon dots, carbon nanotubes, graphene, and carbon nanofibers.

[Negative Electrode Sheet]

The electrode sheet 1 in this embodiment of the present application may be a negative electrode sheet. The negative electrode sheet includes a negative electrode current collector and a negative electrode film layer provided on the negative electrode current collector.

The negative electrode current collector may be a metal foil sheet or a composite current collector. The negative electrode current collector may be copper foil. The composite current collector may be formed by forming a metal material (copper, a copper alloy, nickel, a nickel alloy, titanium, a titanium alloy, silver, a silver alloy, or the like) on the polymer material substrate (e.g., a substrate of polypropylene (PP), polyethylene terephthalate (PET), polybutylene terephthalate (PBT), polystyrene (PS), or polyethylene (PE)).

The negative electrode film layer includes a negative electrode active material. The negative electrode active material may be a negative electrode active material for a battery commonly known in the art. For example, the negative electrode active material may include at least one of the following materials: synthetic graphite, natural graphite, soft carbon, hard carbon, a silicon-based material, a tin-based material, lithium titanate, etc. The silicon-based material may be selected from at least one of elemental silicon, a silicon-oxygen compound, a silicon-carbon composite, a silicon-nitrogen composite, and a silicon alloy. The tin-based material may be selected from at least one of elemental tin, a tin-oxygen compound, and a tin alloy. However, the present application is not limited to these materials, and another conventional material that can be used as a negative electrode active material of a battery may also be used. These negative electrode active materials may be used alone or in combination of two or more thereof.

The negative electrode film layer optionally further includes a conductive agent. The conductive agent may be selected from at least one of superconducting carbon, acetylene black, carbon black, Ketjen black, carbon dots, carbon nanotubes, graphene, and carbon nanofibers.

[Electrolyte]

The electrolyte functions to conduct ions between the positive electrode tab and the negative electrode tab. The type of the electrolyte is not specifically limited in this embodiment of the present application, and may be selected according to a requirement. For example, the electrolyte may be liquid, gelled or all solid.

In some embodiments, the electrolyte is an electrolyte solution. The electrolyte solution includes an electrolyte salt and a solvent.

The electrolyte salt may include at least one of lithium hexafluorophosphate, lithium tetrafluoroborate, lithium perchlorate, lithium hexafluoroarsenate, lithium bisfluorosulfonylimide, lithium bistrifluoromethanesulfonylimide, lithium trifluoromethanesulfonate, lithium difluorophosphate, lithium difluorooxalatoborate, lithium dioxalatoborate, lithium difluorodioxalatophosphate, and lithium tetrafluorooxalatophosphate.

The solvent may include at least one of ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, dimethyl sulfone, ethyl methyl sulfone, and diethyl sulfone.

The electrolyte optionally further includes a negative electrode film-forming additive, a positive electrode film-forming additive, and may further include an additive capable of improving specific performance of the battery, for example, an additive improving overcharge performance of the battery, an additive improving high-temperature or low-temperature performance of the battery, and the like.

[Separator]

The separator is used to separate the positive electrode sheet from the negative electrode sheet. The type of the separator is not particularly limited in this embodiment of the present application, and any commonly known porous separator having good chemical stability and mechanical stability may be used.

A material of the separator may be selected from at least one of glass fibers, nonwoven fabrics, polyethylene, polypropylene, and polyvinylidene fluoride. The separator may be a single-layer thin film or may be a multi-layer composite thin film, which is not particularly limited. When the separator is a multi-layer composite thin film, materials of each layer may be the same or different, which is not particularly limited.

The positive electrode sheet, the negative electrode sheet, and the separator may be formed into an electrode assembly through a winding process or a lamination process.

[Battery Cell]

An embodiment of the present application provides a battery cell including the electrode sheet 1 in the embodiment above and/or the electrode sheet prepared by the method in the embodiment above.

The shape of the battery cell is not particularly limited in this embodiment of the present application, and may be a cylindrical shape, a square shape, or any other shape. The battery cell may be a lithium ion battery, a lithium sulfur battery, a sodium ion battery, a magnesium ion battery, etc.

Figure 10:
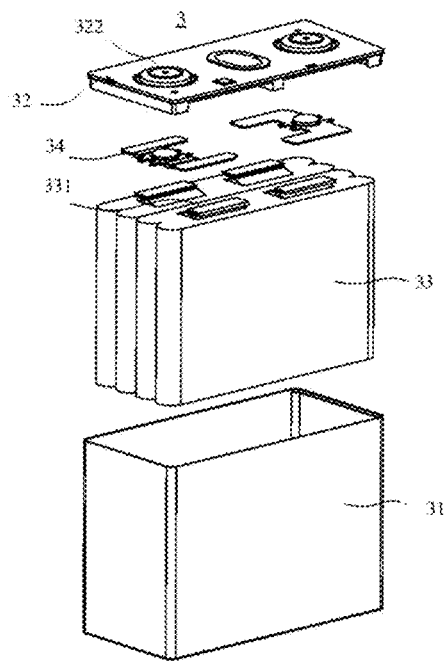
FIG. 10 is a schematic diagram of a battery cell according to an embodiment of the present application.

FIG. 10 is a schematic diagram of a battery cell according to an embodiment of the present application. For example, as shown in FIG. 10, the battery cell 3 is a square battery cell. The battery cell 3 includes a housing 31, an end cover assembly 32, and an electrode assembly 33 provided in the housing 31.

The electrode assembly 33 may be formed by the positive electrode sheet, the negative electrode sheet, and the separator through a winding process or a lamination process. In some embodiments, the positive electrode sheet is the electrode sheet 1 in the embodiments of the present application.

The end cover assembly 32 includes an electrode terminal 322. For example, as shown in FIG. 10, the end cover assembly 32 includes two electrode terminals 322, one of which is a positive electrode terminal and the other is a negative electrode terminal.

The battery cell 3 further includes a current collecting member 34 for connecting a tab portion 331 of the electrode assembly 33 and the electrode terminal 322. For example, when the electrode sheet 1 in the embodiments of the present application is a positive electrode sheet, one current collecting member 34 is used to connect a positive electrode tab portion (which may also be the tab 102 of the electrode sheet 1) and the positive electrode terminal, and another current collecting member 34 is used to connect a negative electrode tab and the negative electrode terminal.

In some embodiments, the battery cell may be assembled into a battery module, there may be one or a plurality of battery cells included in the battery module, and those skilled in the art may select a specific quantity based on the application and capacity of the battery module.

[Battery]

Figure 11:
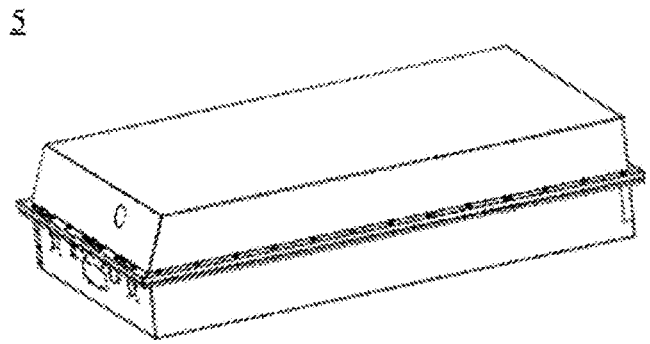
FIG. 11 is a schematic diagram of a battery according to an embodiment of the present application.

An embodiment of the present application provides a battery including the battery cell in the embodiments above. FIG. 11 is a schematic diagram of a battery according to an embodiment of the present application. As shown in FIG. 11, the battery 5 may include a plurality of battery cells (not shown in the figure).

The battery cells 3 may directly constitute the battery 5. Alternatively, the battery cells may first constitute a battery module, and then a plurality of battery modules constitute the battery 5.

[Electric Device]

An embodiment of the present application provides an electric device including the battery in the embodiments above.

Figure 12:
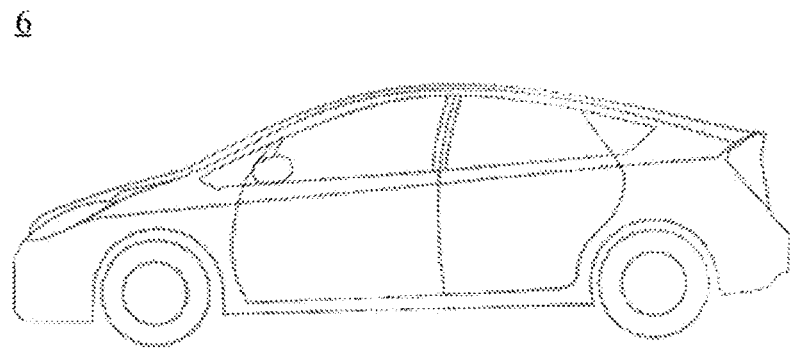
FIG. 12 is a schematic diagram of an electric device according to an embodiment of the present application.

FIG. 12 is a schematic diagram of an electric device according to an embodiment of the present application. As shown in FIG. 12, the present application provides an electric device 6, which includes the battery in the embodiments above.

Optionally, the electric device may be an energy storage device, an illumination device, a spacecraft, etc., and this embodiment of the present application includes, but is not limited to this.

Examples of the present application are described below. The examples described below are illustrative only and are not to be construed as limiting the present application. In the examples, specific techniques or conditions are not indicated, and they are performed according to techniques or conditions described in documents in the art or according to the specification of the product. The reagents or instruments used without specifying the manufacturer(s) are conventional products that are commercially available.

EXAMPLES

Example 1

The electrode sheet in Example 1 has a structure as shown in FIG. 2. In Example 1, the first thermoplastic polymer in the second insulating layer has a volume particle size distribution $D_v50$ of 5 μm, the second thermoplastic polymer has a volume particle size distribution $D_v50$ of 50 μm, the material of the thermoplastic polymer is microcrystalline wax, and a drop melting point of the microcrystalline wax is 80° C. The second insulating layer has a thickness d2 of 30 μm, and the first insulating layer has a thickness d1 of 860 nm. In the second insulating layer, the mass ratio A:B of the thermoplastic polymer to the binder is 80:20, and the mass ratio m1:m2 of the first thermoplastic polymer to the second thermoplastic polymer is 50:25.

Examples 2-5

Examples 2-5 differ from Example 1 in terms of the volume particle size distributions $D_v50$ of the first thermoplastic polymer and the second thermoplastic polymer in the second insulating layer. Specific parameters may refer to Table 1.

Examples 6-9

Examples 6-9 differ from Example 1 in terms of the mass ratio m1:m2 of the first thermoplastic polymer to the second thermoplastic polymer.

Examples 10-13

Examples 10-13 differ from Example 1 in terms of the thickness of the second insulating layer. Accordingly, as the thickness of the second insulating layer changes, the thickness of the first insulating layer and the resistance of the end surface also change.

Examples 14-17

Examples 14-17 differ from Example 1 in terms of the material of the thermoplastic polymer. Accordingly, the drop melting points of the thermoplastic polymers are different. PTFE is polytetrafluoroethylene.

Examples 18-19

Examples 18-19 differ from Example 1 in terms of the mass ratio of the thermoplastic polymer to the binder in the second insulating layer.

Comparative Example 1

Comparative Example 1 differs from Example 1 in that: the material of the second insulating layer does not include a thermoplastic polymer, and the material in the second insulating layer includes boehmite.

Comparative Examples 2-5

Comparative Examples 2-5 differ from Example 14 in terms of the volume particle size distributions of the first thermoplastic polymer and the second thermoplastic polymer.

In Table 1, $D^1_v50$ represents the volume particle size distribution of the first thermoplastic polymer, and $D^2_v50$ represents the volume particle size distribution of the second thermoplastic polymer. d1 represents the thickness of the first insulating layer, d2 represents the thickness of the second insulating layer, R represents the resistance at the end surface, m1:m2 represents the mass ratio of the first thermoplastic polymer to the second thermoplastic polymer, and A:B represents the mass ratio of the thermoplastic polymer to the binder in the second insulating layer. In Table 2, R1 represents a resistance at the second insulating layer.

TABLE 1

Parameters in Examples and Comparative Examples

| | | | | Second insulating layer | | | | | |
| | | | | Thermoplastic polymer | | | | | |
| | d1/nm | R/Ω | d2/μm | Material | $D^1v50$ | $D^2v50$ | m1:m2 | drop melting point/° C. | A:B |
|---|---|---|---|---|---|---|---|---|---|
| Example 1 | 860 | Infinity | 30 | Microcrystalline wax | 5 | 50 | 2:1 | 80 | 75:25 |
| Example 2 | 860 | Infinity | 30 | Microcrystalline wax | 4 | 40 | 2:1 | 80 | 75:25 |
| Example 3 | 860 | Infinity | 30 | Microcrystalline wax | 3 | 35 | 2:1 | 80 | 75:25 |
| Example 4 | 860 | Infinity | 30 | Microcrystalline wax | 2 | 30 | 2:1 | 80 | 75:25 |
| Example 5 | 860 | Infinity | 30 | Microcrystalline wax | 1 | 20 | 2:1 | 80 | 75:25 |
| Example 6 | 860 | Infinity | 30 | Microcrystalline wax | 1 | 40 | 1:1 | 80 | 75:25 |
| Example 7 | 860 | Infinity | 30 | Microcrystalline wax | 1 | 40 | 3:1 | 80 | 75:25 |
| Example 8 | 860 | Infinity | 30 | Microcrystalline wax | 1 | 40 | 1:1.5 | 80 | 75:25 |
| Example 9 | 860 | Infinity | 30 | Microcrystalline wax | 1 | 40 | 4:1 | 80 | 75:25 |
| Example 10 | 200 | 100 | 20 | Microcrystalline wax | 1 | 40 | 2:1 | 80 | 75:25 |
| Example 11 | 550 | 2000 | 25 | Microcrystalline wax | 1 | 40 | 2:1 | 80 | 75:25 |
| Example 12 | 1300 | Infinity | 40 | Microcrystalline wax | 1 | 40 | 2:1 | 80 | 75:25 |
| Example 13 | 2000 | Infinity | 50 | Microcrystalline wax | 1 | 40 | 2:1 | 80 | 75:25 |
| Example 14 | 860 | Infinity | 30 | PMMA | 1 | 40 | 1:1 | 200 | 75:25 |
| Example 15 | 860 | Infinity | 30 | Polyamide | 1 | 40 | 1:1 | 220 | 75:25 |
| Example 16 | 860 | Infinity | 30 | Polypropylene | 1 | 40 | 1:1 | 150 | 75:25 |
| Example 17 | 860 | Infinity | 30 | PTFE | 1 | 40 | 1:1 | 110 | 75:25 |
| Example 18 | 860 | Infinity | 30 | Microcrystalline wax | 1 | 40 | 1:1 | 80 | 65:35 |
| Example 19 | 860 | Infinity | 30 | Microcrystalline wax | 1 | 40 | 1:1 | 80 | 55:45 |
| Comparative Example 1 | / | / | 30 | Boehmite | / | / | / | / | 75:25 |
| Comparative Example 2 | / | / | 30 | PMMA | 0.8 | 40 | 1:1 | 200 | 75:25 |
| Comparative Example 3 | 860 in a partial region | Infinity in a partial region | 30 | PMMA | 10 | 40 | 1:1 | 200 | 75:25 |

TABLE 1-continued

Parameters in Examples and Comparative Examples

| | Second insulating layer | | | | | | | | | |
|---|---|---|---|---|---|---|---|---|---|---|
| | | | | | Thermoplastic polymer | | | | | |
| | d1/nm | R/Ω | d2/μm | Material | $D^1v50$ | $D^2v50$ | m1:m2 | drop melting point/°C. | A:B |
| Comparative Example 4 | 860 in a partial region | Infinity in a partial region | 30 | PMMA | 1 | 80 | 1:1 | 200 | 75:25 |
| Comparative Example 5 | 860 in a partial region | Infinity in a partial region | 30 | PMMA | 1 | 10 | 1:1 | 200 | 75:25 |

TABLE 2

Experimental results of Comparative Examples and Examples

| | Second insulating layer | | | Whether a fire occurs when the position of the second insulating layer overlaps a fully charged anode | Whether a fire occurs when the end surface overlaps a fully charged anode | Whether there is a polymer at the second insulating layer | Whether there is a polymer at the end surface |
|---|---|---|---|---|---|---|---|
| | Whether it contracts | Resistance R2/Ω | Whether it agglomerates | | | | |
| Example 1 | No | Infinity | No | No fire | No fire | Yes | Yes |
| Example 2 | No | Infinity | No | No fire | No fire | Yes | Yes |
| Example 3 | No | Infinity | No | No fire | No fire | Yes | Yes |
| Example 4 | No | Infinity | No | No fire | No fire | Yes | Yes |
| Example 5 | No | Infinity | No | No fire | No fire | Yes | Yes |
| Example 6 | No | Infinity | No | No fire | No fire | Yes | Yes |
| Example 7 | No | Infinity | No | No fire | No fire | Yes | Yes |
| Example 8 | No | Infinity | No | No fire | No fire | Yes | Yes |
| Example 9 | No | 100 in a partial region, infinity in the other region | No | No fire | No fire | Yes | Yes |
| Example 10 | No | 1000 | No | No fire | No fire | Yes | Yes |
| Example 11 | No | 2000 | No | No fire | No fire | Yes | Yes |
| Example 12 | No | Infinity | No | No fire | No fire | Yes | Yes |
| Example 13 | No | Infinity | No | No fire | No fire | Yes | Yes |
| Example 14 | No | Infinity | No | No fire | No fire | Yes | Yes |
| Example 15 | No | Infinity | No | No fire | No fire | Yes | Yes |
| Example 16 | No | Infinity | No | No fire | No fire | Yes | Yes |
| Example 17 | No | Infinity | No | No fire | No fire | Yes | Yes |
| Example 18 | No | Infinity | No | No fire | No fire | Yes | Yes |
| Example 19 | No | Infinity | No | No fire | No fire | Yes | Yes |
| Comparative Example 1 | / | / | / | / | Fire | None | None |
| Comparative Example 2 | / | / | Yes | / | / | / | / |
| Comparative Example 3 | No | Infinity | No | / | Fire in a partial region | Yes | Yes |
| Comparative Example 4 | No | Infinity | No | No fire | Fire in a partial region | Yes | Yes |
| Comparative Example 5 | Yes | 0.1 in a partial region, infinity in the other region | No | Fire in a partial region | No fire | Yes | Yes |

[Preparation of a Battery Cell]

(1) Preparation of a Paste of a Second Insulating Coating

The thermoplastic polymer (including the first thermoplastic polymer and the second thermoplastic polymer) and the binder were mixed according to a ratio, then a solvent was added, and the mixture was mixed well, with viscosity of paste being bout 3000 MPa·s. The binder was polyvinylidene fluoride (PVDF), and the solvent was nitrogen methyl pyrrolidone. The specific thermoplastic polymer and the ratio of the thermoplastic polymer to the binder may refer to Table 1.

(2) Coating and Drying

Aluminum foil was coated with a positive electrode active paste to prepare an active material layer, where a positive electrode active material in the positive electrode active paste is $LiNi_{0.8}Co_{0.1}Mn_{0.1}O_2$(NCM811); and the aluminum foil was coated with the above insulating coating paste, with a coating width of 3 mm. Drying was carried out in an oven with a drying temperature of 100° C., where the thickness of the second insulating layer after drying is specifically as shown in Table 1. Here, the thickness of the second insulating layer refers to the thickness of the second insulating layer on a single side of the current collector.

(3) Laser Die Cutting

The above product was die cut, where specific process parameters are as shown in Table 1.

(4) Fabrication of a Battery Cell

The above positive electrode sheet and other assemblies required for the battery: the negative electrode sheet, the separator, and the electrolyte, were assembled together into a lithium ion battery cell.

[Confirmation of the First Insulating Layer]

A scanning electron microscope was used to observe the end surface and the second insulating layer, so as to see whether the first insulating layer is present at the end surface and the second insulating layer.

[Confirmation of the Second Insulating Layer]

A scanning electron microscope was used to observe whether the second insulating layer contracts and whether the thermoplastic polymer is present at the position of the second insulating layer.

[Test of Overlapping a Fully Charged Anode]

Monitoring for a fire was performed in the case where the end surface after laser die cutting overlaps the fully charged anode.

[Test of the Second Insulating Layer Overlapping a Fully Charged Anode]

Monitoring for a fire was performed in the case where a region of the second insulating layer close to the cutting line overlaps the fully charged anode.

[Performance Test for the Paste]

During preparation of the coating paste of the second insulating layer, monitoring for whether polymer particles in the paste agglomerate was performed.

[Test for a Resistance]

The resistance of the end surface and the resistance of the second insulating layer may be measured using an ohmmeter.

For example, an end of the ohmmeter was connected to a tab (specifically, a portion of the tab coated with no second insulating layer) of the positive electrode sheet in the embodiments, and the other end was connected to a tab of the negative electrode sheet, where the negative electrode sheet overlaps the end surface or the second insulating layer region of the positive electrode sheet.

[Test for the Particle Size of the Thermoplastic Polymer]

The volume particle size distribution of the thermoplastic polymer may be determined by means of a particle size analyzer-laser diffraction method, and specifically, may be measured using a laser diffraction scattering particle size analyzer according to an instruction from a manufacturer with reference to the standard GB/T19077-2016. For example, prior to preparation of the paste of the second insulating layer, an appropriate amount of thermoplastic polymer was taken, and an average volume particle size of the material was measured using a MasterSizer 2000 laser particle size analyzer. An appropriate amount of sample was taken (with a sample concentration sufficient to ensure 8-12% opacity), 20 ml of deionized water was added, while out for 5 min (53 KHz/120 W) to ensure full dispersion of the sample, and then the sample was measured according to the GB/T19077-2016/ISO 13320:2009 standard.

For another example, the electrode sheet may be tested using a scanning electron microscope, so as to obtain an image of the region of the second insulating layer of the electrode sheet. A region of a specific size was selected, and the volume particle size distribution of the thermoplastic polymer was calculated based on the number and size of thermoplastic polymers in the image.

[Confirmation of a Drop Melting Point of the Thermoplastic Polymer]

The drop melting point of the thermoplastic polymer may be measured according to the GB/T8026-2014 standard. For example, a cooled temperature sensor was vertically immersed in the sample so that the sample adheres to the temperature sensor, then placed in a test tube, and heated at a desired temperature rising rate, to start melting the sample. When a first drop of the sample on the sensor drops, a temperature from the sensor at this time is the drop melting point of the sample.

For another example, the drop melting point of the thermoplastic polymer may be determined based on the specific thermoplastic polymer after the specific type of the thermoplastic polymer is determined. For example, for a crystalline thermoplastic polymer, the drop melting point refers to a melting point of the crystalline thermoplastic polymer; and for an amorphous thermoplastic polymer, the drop melting point refers to a glass transition temperature of the amorphous thermoplastic polymer.

[Mass Ratio of the Thermoplastic Polymer to the Binder]

The mass ratio of the thermoplastic polymer to the binder may be obtained according to masses of the thermoplastic polymer and the binder added during the preparation.

Figure 13:
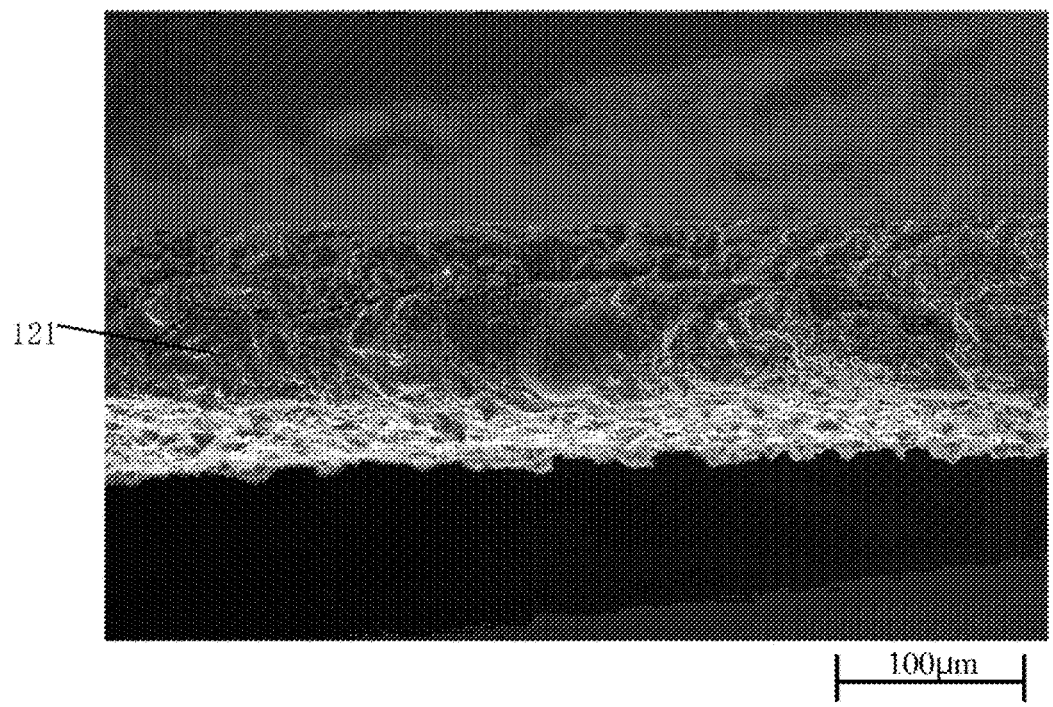
FIG. 13 is an SEM image of an end surface provided with a first insulating layer according to an embodiment of the present application.
Figure 14:
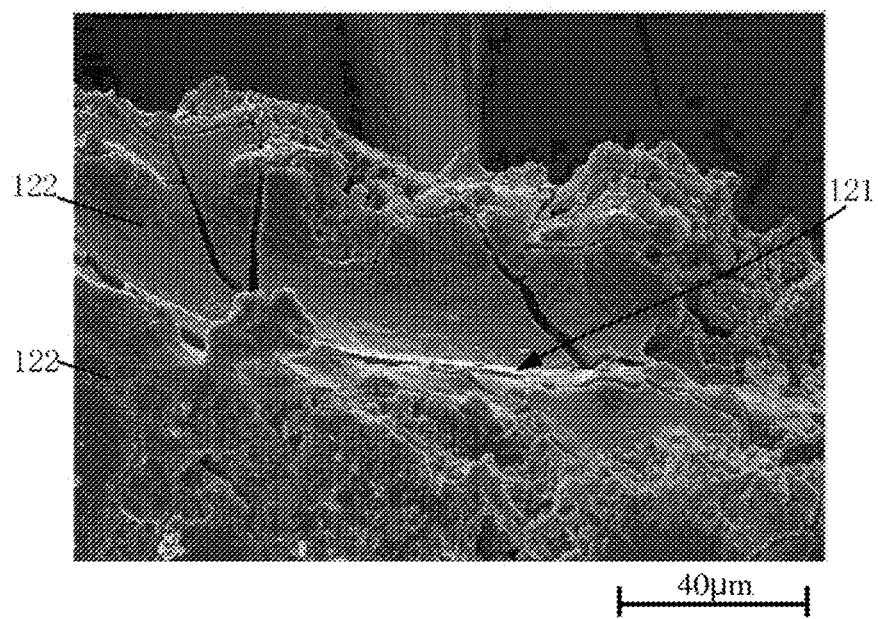
FIG. 14 is an SEM image of a region of a transition region close to a cutting line according to an embodiment of the present application.

FIG. 13 is an SEM image of an end surface provided with a first insulating layer according to an embodiment of the present application. Referring to FIG. 13, the first insulating layer 121 is provided at the end surface of the electrode sheet. FIG. 14 is an SEM image of a region of a transition region close to a cutting line according to an embodiment of the present application. Referring to FIG. 14, FIG. 14 shows the second insulating layer 122 provided on two surfaces in the thickness direction of the electrode sheet. In the region of the transition region close to the cutting line, the first thermoplastic polymer and the second thermoplastic polymer in the second insulation layer melt and solidify again after cooled.

With reference to Examples 1-19 and Comparative Example 1, the first insulating layer is provided on the end surface of the electrode sheet, and no fire occurs after the end surface of the electrode sheet overlap the fully charged anode. Therefore, the technical solution of this embodiment of the present application can improve the reliability of the battery cell.

With reference to Examples 1-5, by properly setting the particle sizes of the first thermoplastic polymer and the second thermoplastic polymer, the second insulating layer refrains from contraction, which is advantageous to the improvement of the reliability of the battery cell.

With reference to Example 14 and Comparative Example 2, in the case where a median volume particle size of the first thermoplastic polymer is less than 1 μm, the first thermoplastic polymer agglomerates during preparation of the paste of the second insulating layer.

With reference to Example 14 and Comparative Example 3, in the case where the median particle size of the first thermoplastic polymer is greater than 5 μm, a fire occurs in a partial region when the end surface of the prepared electrode sheet overlaps the fully charged anode, which is disadvantageous to the obtaining of the uniform, dense first insulating layer.

With reference to Example 14 and Comparative Example 4, in the case where a median particle size of the second thermoplastic polymer is greater than 50 μm, a fire occurs in a partial region when the end surface of the prepared electrode sheet overlaps the fully charged anode, which is disadvantageous to the obtaining of the uniform, dense first insulating layer.

With reference to Example 14 and Comparative Example 5, in the case where the median particle size of the second thermoplastic polymer is less than 20 μm, the second insulating layer contracts, and a fire occurs in a partial region when the second insulating layer overlaps the fully charged anode, which is disadvantageous to the obtaining of the uniform, dense second insulating layer.

With reference to Examples 6-9, by setting the mass ratio of the first thermoplastic polymer to the second thermoplastic polymer to be 1:1 to 3:1, the second insulating layer refrains from contraction, which is advantageous to further improvement of the reliability of the battery cell. With reference to Example 9, in the case where the mass ratio of the first thermoplastic polymer to the second thermoplastic polymer exceeds 3:1, the second insulating layer does not contract, but a partial resistance at the second insulating layer is small.

With reference to Examples 10-13, by properly setting the thickness of the second insulating layer, the first insulating layer with an appropriate thickness may be obtained after cutting.

With reference to Examples 14-17, the thermoplastic polymer in the second insulating layer may be of a variety of materials.

With reference to Examples 18-19, the thermoplastic polymer and the binder in the second insulating layer may be properly set to adapt to various mass ratios.

It should be noted that the present application is not limited to the above-described implementation. The above-described implementation is merely an example, and any implementation having substantially the same configuration as the technical concept and exhibiting the same operation and effect within the scope of the claims of the present application is included in the technical scope of the present application. In addition, various modifications that can be conceived by those skilled in the art may be made to the implementations without departing from the subject matter of the present application, and other implementations constructed by combining some of the constituent elements in the implementations are also included in the scope of the present application.

What is claimed is:

1. An electrode sheet, comprising a current collector, an active material layer, a first insulating layer, and a second insulating layer, wherein
    the current collector comprises a body portion and a tab extending from a first end of the body portion, the first end is an end of the body portion in a first direction, and the body portion comprises a coated region and a transition region provided between the coated region and the tab;
    the active material layer is provided on a surface of the coated region;
    the first insulating layer is provided on an end surface of the body portion at the first end; and
    at least part of the second insulating layer is provided on a surface of the transition region, the second insulating layer comprises a thermoplastic polymer comprising a first thermoplastic polymer and a second thermoplastic polymer, the first thermoplastic polymer has a volume particle size distribution $D_V50$ of 1 μm to 5 μm, and the second thermoplastic polymer has a volume particle size distribution $D_V50$ of 20 μm to 50 μm.

2. The electrode sheet according to claim 1, wherein the second thermoplastic polymer has a volume particle size distribution $D_V50$ of 20 μm to 40 μm.

3. The electrode sheet according to claim 1, wherein in the second insulating layer, a mass ratio m1:m2 of the first thermoplastic polymer to the second thermoplastic polymer is 1:1 to 3:1.

4. The electrode sheet according to claim 1, wherein a drop melting point of the thermoplastic polymer is 80° C. to 220° C.

5. The electrode sheet according to claim 1, wherein a material of the thermoplastic polymer comprises at least one of a crystalline thermoplastic polymer and an amorphous thermoplastic polymer; the crystalline thermoplastic polymer comprises at least one of polyethylene, polypropylene, and polyamide; and the amorphous thermoplastic polymer comprises at least one of microcrystalline wax, polystyrene, and polymethyl methacrylate.

6. The electrode sheet according to claim 1, wherein the second insulating layer further comprises a binder.

7. The electrode sheet according to claim 6, wherein in the second insulating layer, a mass ratio A:B of the thermoplastic polymer to the binder is 55:45 to 75:25.

8. The electrode sheet according to claim 1, wherein a resistance R of the end surface provided with the first insulating layer satisfies R≥100 Ω.

9. The electrode sheet according to claim 1, wherein the second insulating layer has a thickness d2 of 20 μm to 50 μm; and/or the first insulating layer has a thickness d1 of 200 nm to 2000 nm.

10. The electrode sheet according to claim 1, wherein the second insulating layer comprises a first portion and a second portion, the first portion is provided on a surface of the transition region, and the second portion extends from the first portion and is provided on a part of a surface of the tab.

11. The electrode sheet according to claim 10, wherein in a second direction, the first insulating layer is provided on end surfaces of two ends of a region of the tab provided with the second portion, and the second direction is different from the first direction.

12. The electrode sheet according to claim 1, wherein a material of the first insulating layer is the same as the material of the thermoplastic polymer in the second insulating layer.

13. The electrode sheet according to claim 1, wherein a thermoplastic polymer in the first insulating layer is in the shape of a film layer, and the thermoplastic polymer in the second insulating layer comprises a thermoplastic polymer in the shape of a film layer and a thermoplastic polymer in the shape of a particle.

14. The electrode sheet according to claim 1, wherein the current collector comprises aluminum foil.

15. The electrode sheet according to claim 1, wherein the first insulating layer is further provided on an end surface of the body portion at a second end, and the second end is opposite the first end in the first direction.

16. A preparation method for an electrode sheet, comprising:
    providing a current collector;
    coating a first region of the current collector with an active material to form an active material layer;
    coating a second region of the current collector with an insulating paste to form a second insulating layer, wherein the insulating paste comprises a thermoplastic polymer and a binder, the thermoplastic polymer comprises a first thermoplastic polymer and a second thermoplastic polymer, the first thermoplastic polymer has a volume particle size distribution $D_v50$ of 1 μm to 5 μm, and the second thermoplastic polymer has a volume particle size distribution $D_v50$ of 20 μm to 50 μm; and cutting the current collector provided with the second insulating layer along a cutting line, wherein at least part of the cutting line is provided in the second region.

17. The method according to claim 16, wherein the method satisfies at least one of the following:

a) second thermoplastic polymer has a volume particle size distribution DV50 of 20 μm to 40 μm;

b) in the second insulating layer, a mass ratio m1:m2 of the first thermoplastic polymer to the second thermoplastic polymer is 1:1 to 3:1;

c) a drop melting point of the thermoplastic polymer is 80° C. to 220° C.;

d) in the insulating paste, a mass ratio A:B of the thermoplastic polymer to the binder is 55:45 to 75:25; or e) the second insulating layer has a thickness d2 of 20 μm to 50 μm.

18. The method according to claim 16, wherein a material of the thermoplastic polymer comprises at least one of a crystalline thermoplastic polymer and an amorphous thermoplastic polymer; the crystalline thermoplastic polymer comprises at least one of polyethylene, polypropylene, and polyamide; and the amorphous thermoplastic polymer comprises at least one of microcrystalline wax, polystyrene, and polymethyl methacrylate.

19. The method according to claim 16, wherein the cutting the current collector provided with the second insulating layer along a cutting line comprises:

controlling a laser processing tool to cut the current collector provided with the second insulating layer along the cutting line.

20. A battery cell, comprising the electrode sheet according to claim 1.

* * * * *